United States Patent
Bausenwein et al.

(10) Patent No.: US 8,804,229 B2
(45) Date of Patent: Aug. 12, 2014

(54) MULTI-MOEMS DISPLAY

(76) Inventors: Bernhard Rudolf Bausenwein, Hagelstadt (DE); Max Mayer, Forchheim (DE)

( * ) Notice: Subject to any disclaimer, the term of this patent is extended or adjusted under 35 U.S.C. 154(b) by 54 days.

(21) Appl. No.: 13/506,779

(22) Filed: May 17, 2012

(65) Prior Publication Data
US 2012/0294031 A1    Nov. 22, 2012

(51) Int. Cl.
*G02B 26/08*    (2006.01)

(52) U.S. Cl.
CPC .................................. *G02B 26/0833* (2013.01)
USPC .......................................... 359/298; 359/237

(58) Field of Classification Search
CPC ............. G02B 26/0833; G02B 26/084; G02B 26/085; G02B 26/0858; G02B 26/0866; G02B 26/0841
USPC ................................... 362/602; 359/237, 298
See application file for complete search history.

(56) References Cited

U.S. PATENT DOCUMENTS

2005/0141076 A1 * 6/2005 Bausenwein et al. .......... 359/291
2009/0251760 A1 * 10/2009 Pan ................................ 359/291

* cited by examiner

*Primary Examiner* — Darryl J Collins
*Assistant Examiner* — Gary O'Neill

(57) ABSTRACT

The Multi-MOEMS display comprises at least two MOEMS, and at least one superposition layer. All MOEMS are illuminated by beams which incide with incidence angles larger than the deflection angle onto the mirrors in their ON-state for an improved separation of illumination and reflected modulated beams. The reflected ON-beams accordingly include a zenith angle with the normal of the mirror arrays of the MOEMS. The increased angle between the illumination and the modulated beam facilitates the separation of illumination and modulated beams and diminishes the optic limitations of light energy flux through this reflection at the modulators. The Multi-MOEMS display uncovers a solution for the geometric problems of arranging multiple MOEMS and superposition layers posed by the non-normal reflection of the modulated image beams, by matching the zenith angles and the azimuth angles in the superposition image, and by a defined position of the MOEMS relative to the superposition layer.

11 Claims, 25 Drawing Sheets

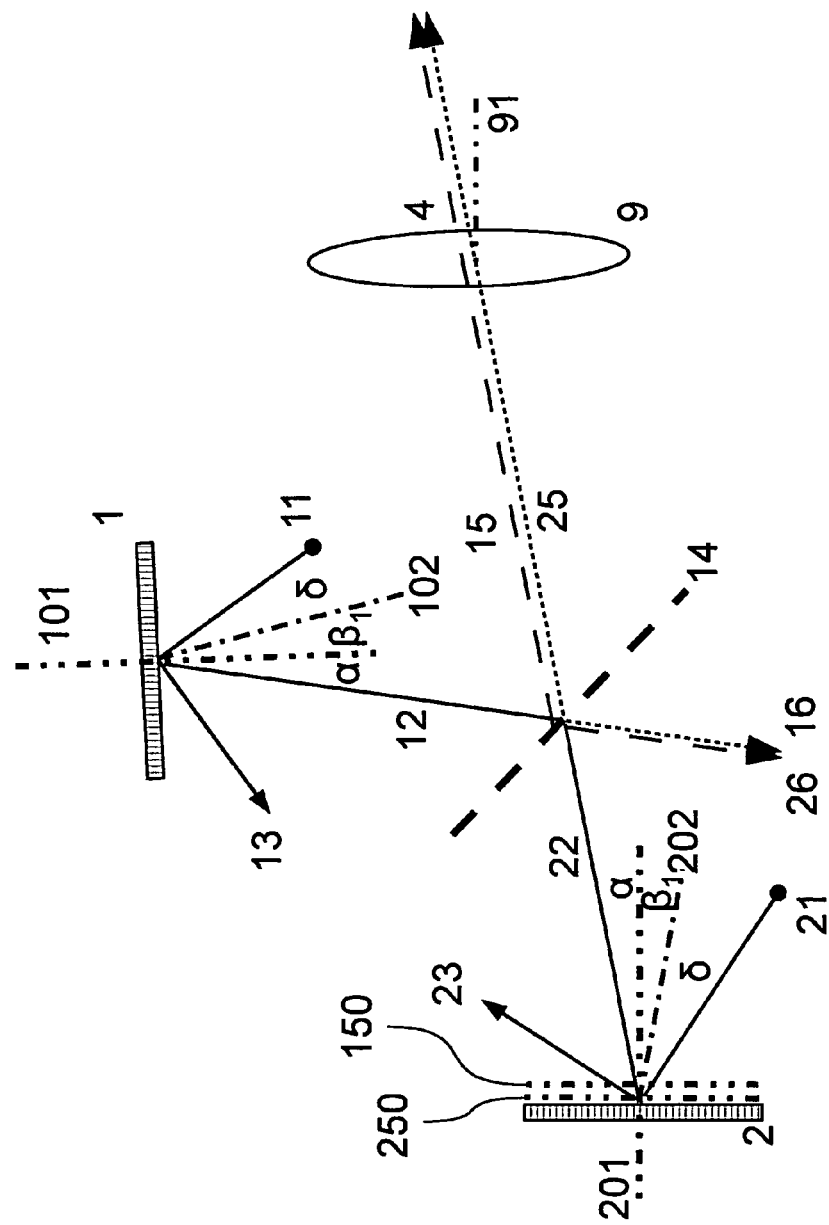

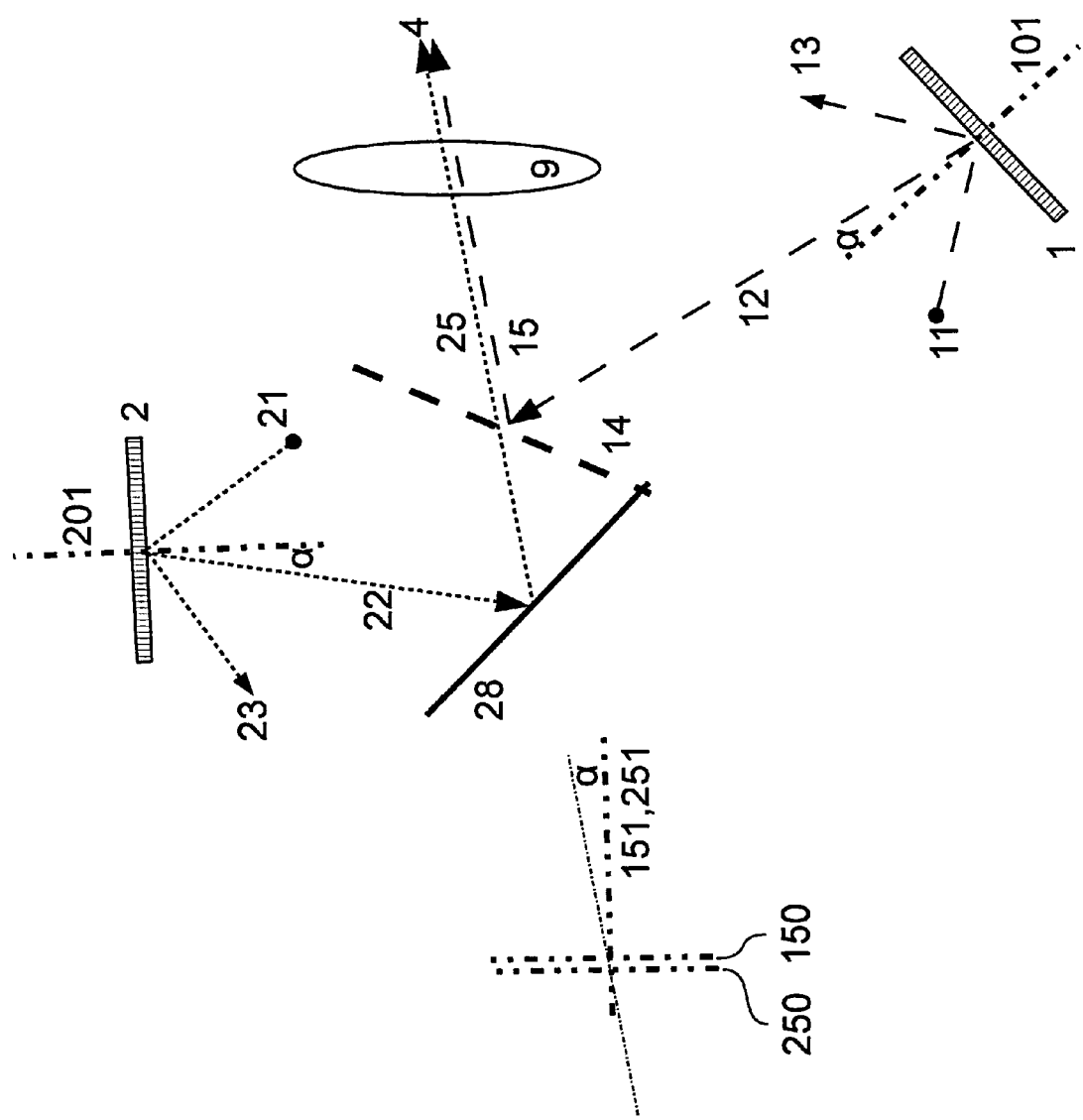

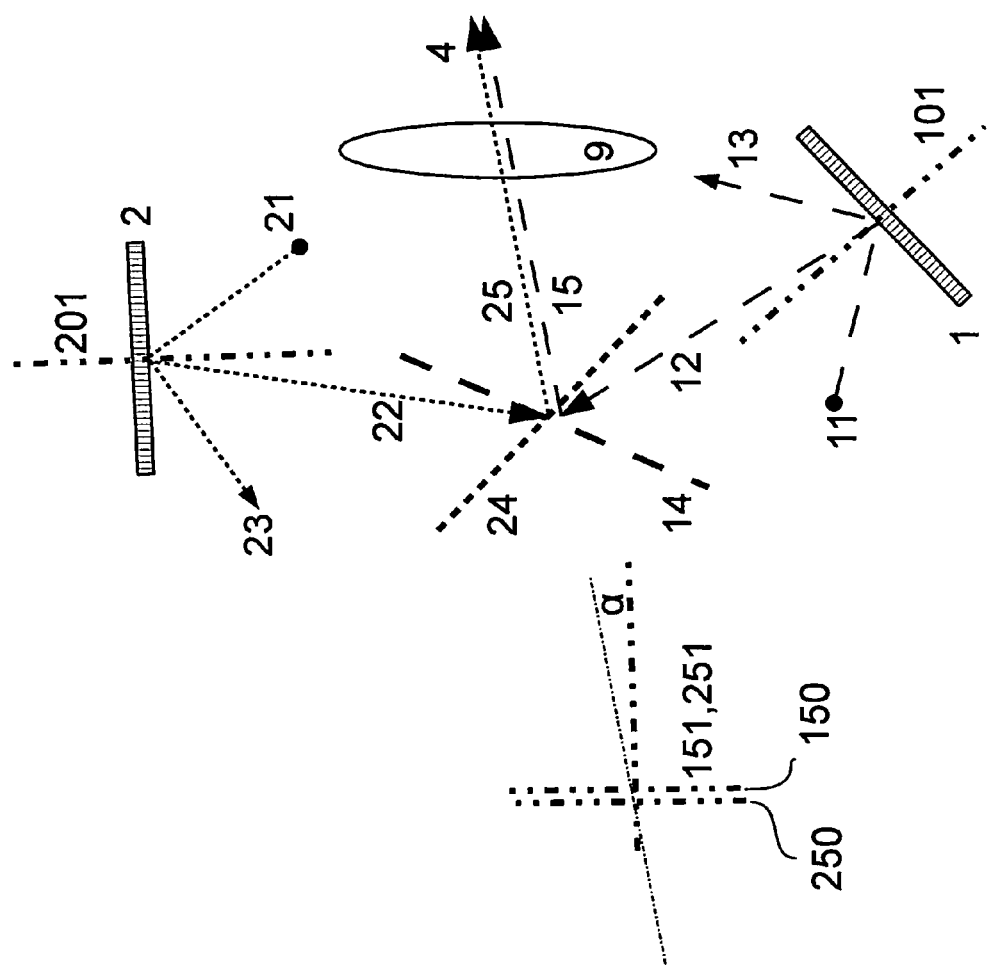
d) FIG.2 a)

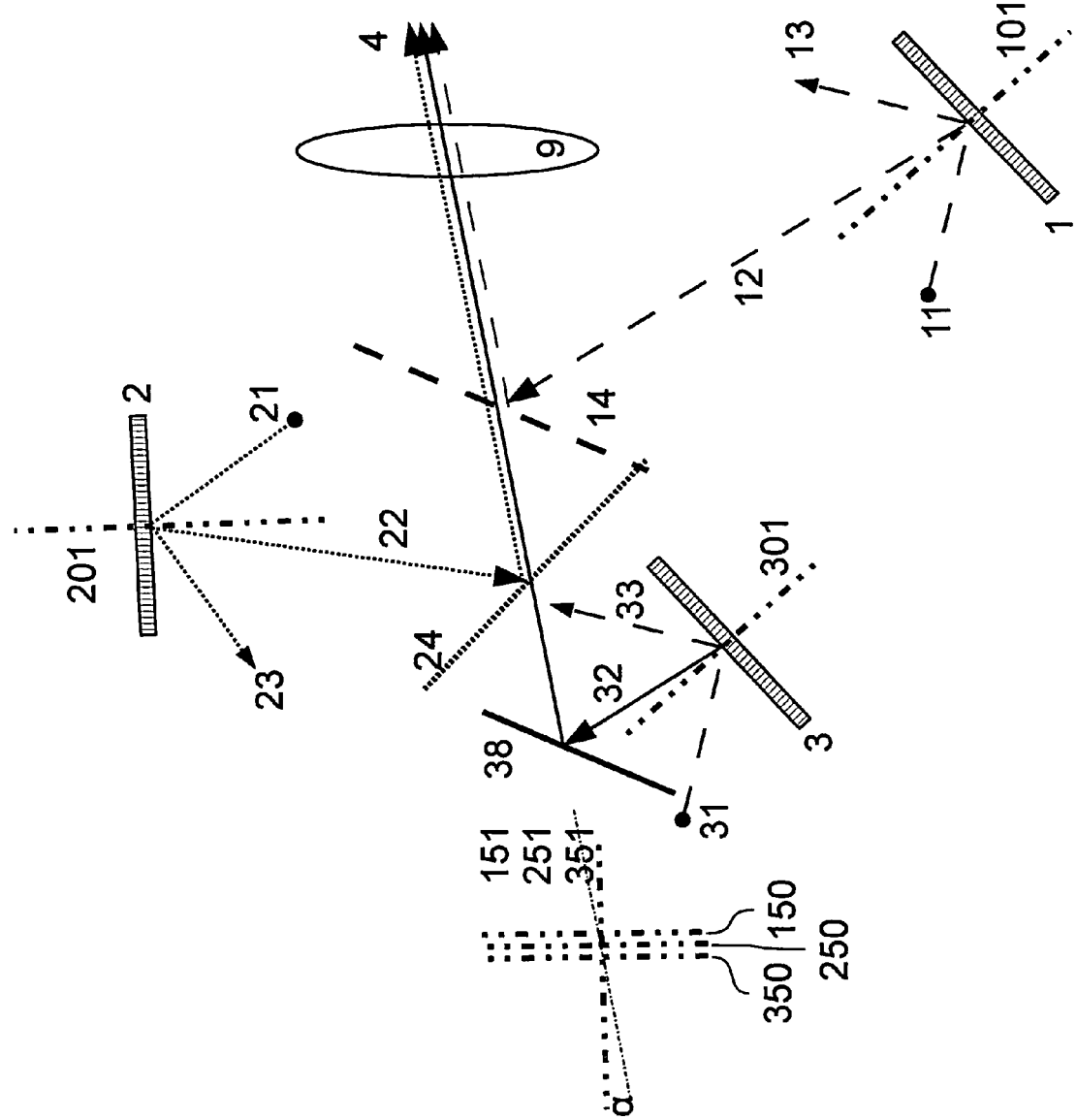
c) FIG.3

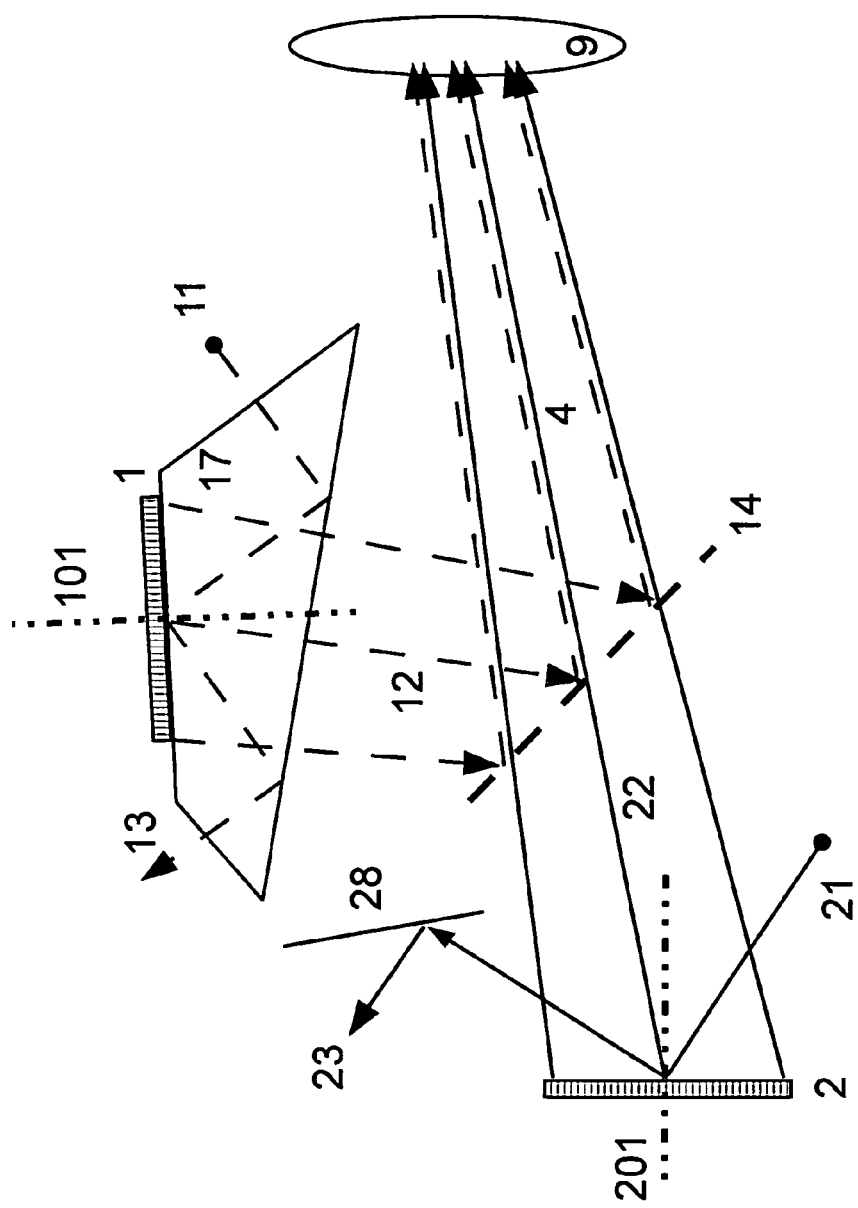

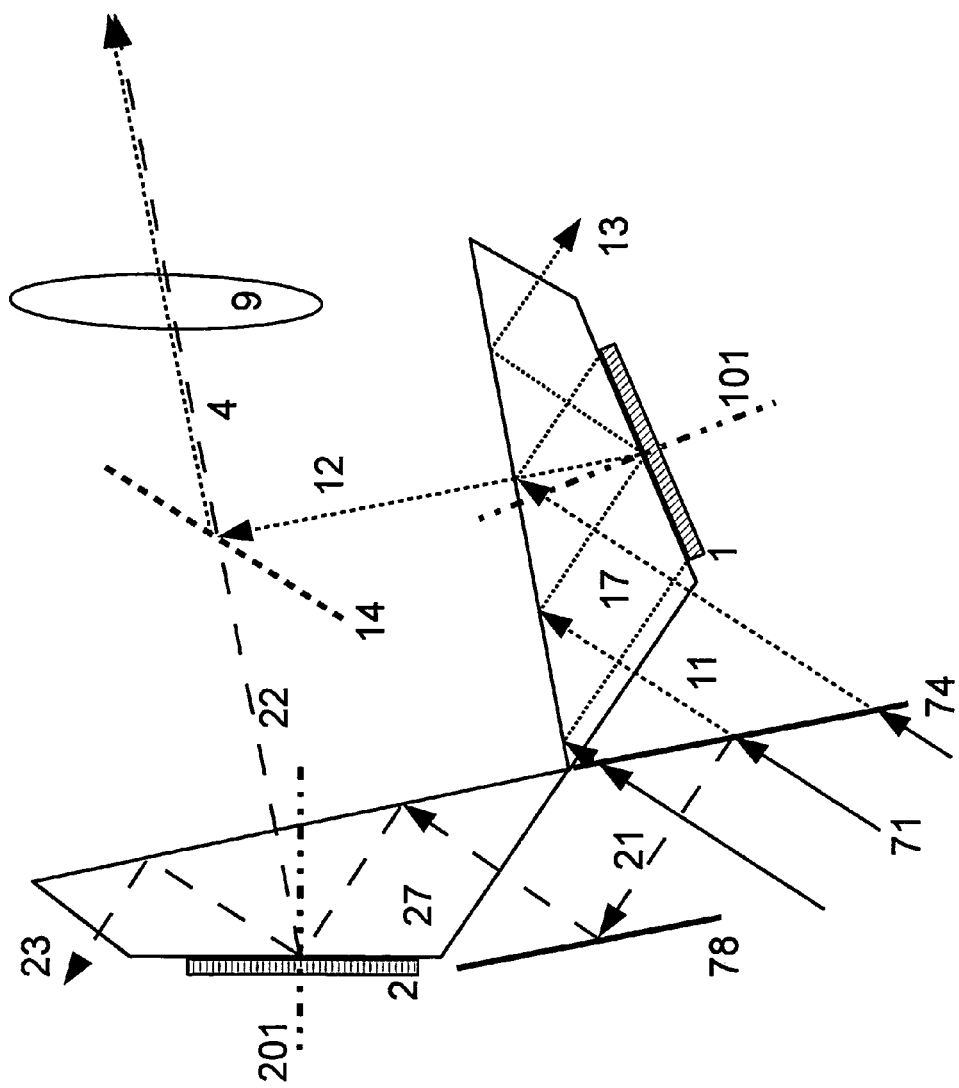
a) FIG.5

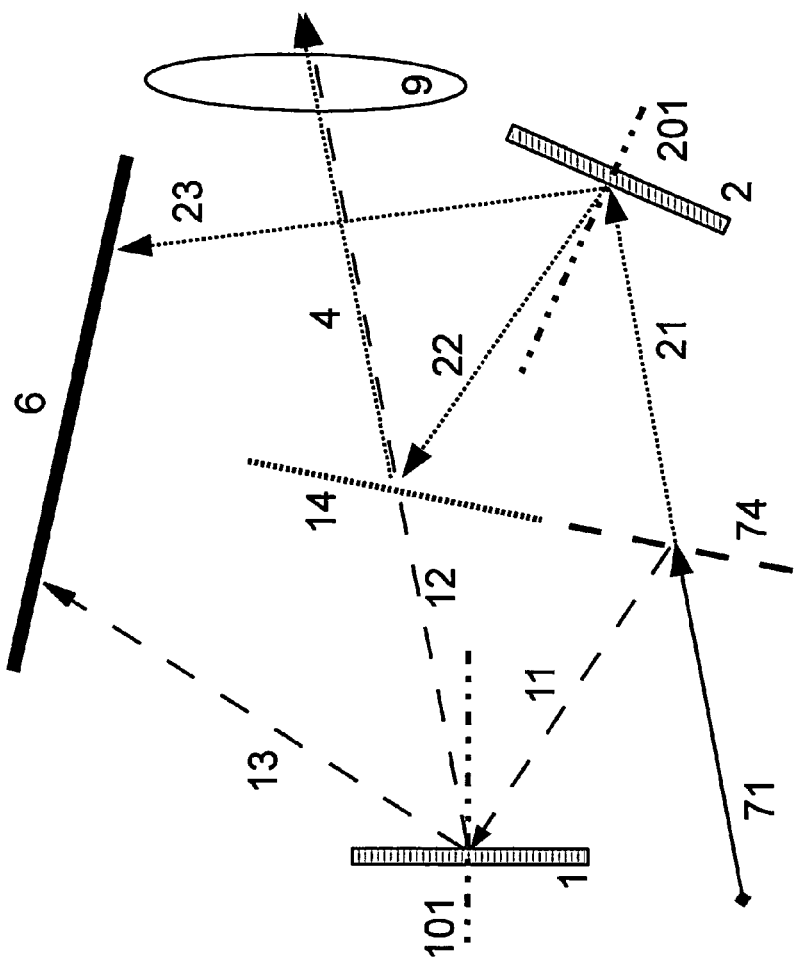
b) FIG.5

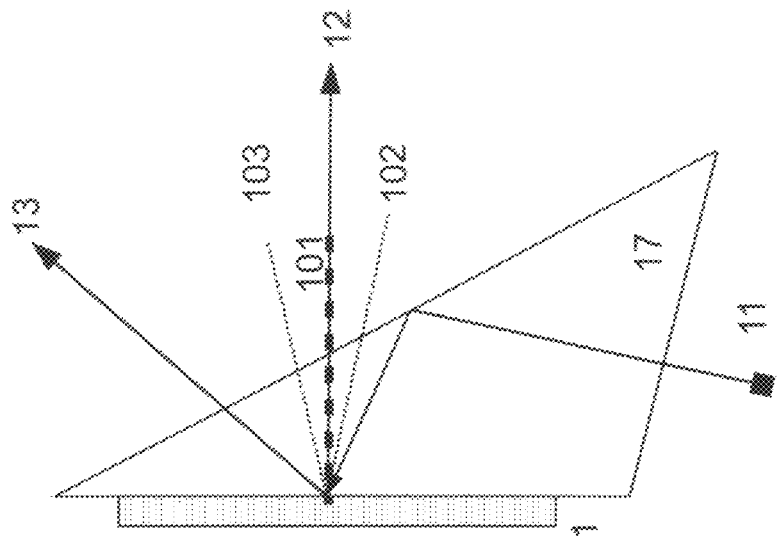
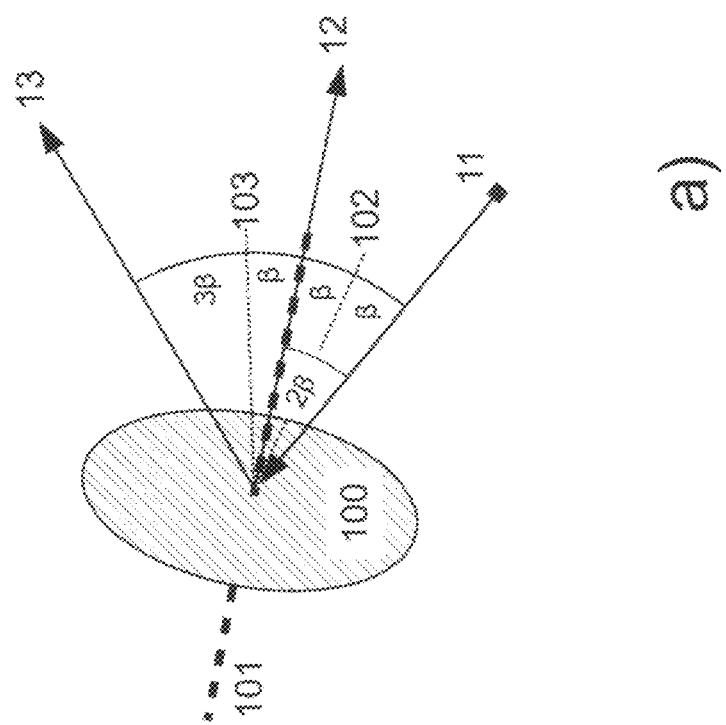
FIG. 10 c) prior art (single MOEMS display)

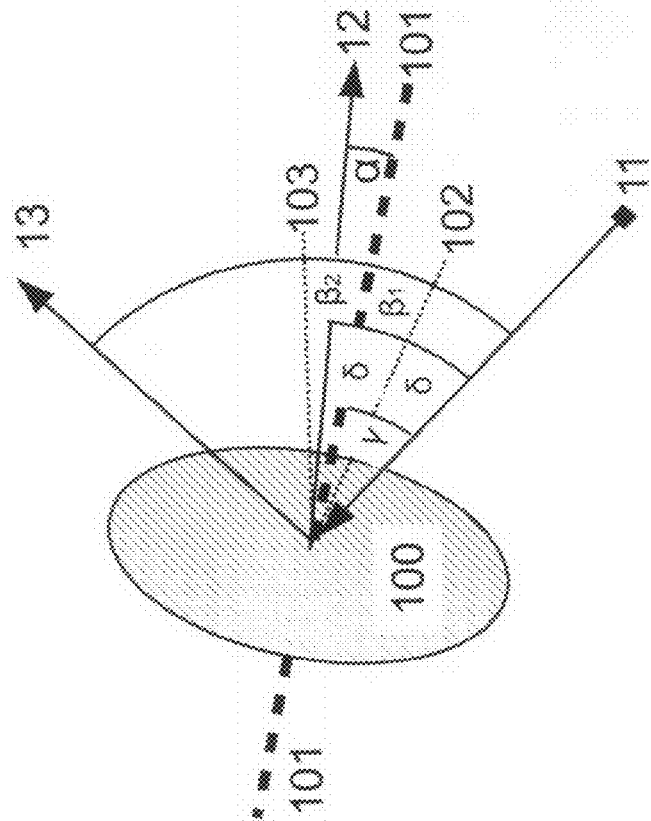
d) FIG. 10
prior art (single MOEMS display)

MULTI-MOEMS DISPLAY

BACKGROUND OF THE INVENTION

The separation angle between the illumination beam and the reflected ON-beam is a limiting factor for the optics and the geometric design of MOEMS displays. Often the modulated beams are reflected in a direction which is normal (perpendicular) to the plane of the mirror array of the MOEMS. The normal direction leads to a simple layout of beam geometry for both the split of the light beam which illuminates the image modulators and, even more so, for the preferred orthogonal and normal superposition. Single and Multi-channel displays with micro opto electro mechanical systems (MOEMS) as image modulators according to the state of the art use TIR prisms to separate the illumination beam and the normally reflected modulated ON-beams. A non-normal direction of the reflected modulated beam is found in the state of the art in single MOEMS displays without superposition, and without the essential requirement of a splitting system. Here, often a TIR-prism for separation is not necessary.

With a non-normal direction of the reflected beam, however, a increased angle between the incident illumination beam and the modulated ON-beam can be achieved, which results with an improved separation of these beams. A multi-channel display with MOEMS as image modulators is therefore desired, in which a superposition system superposes modulated image beams, which are reflected from the mirror arrays in a non-normal direction, to reduce the complexity which is necessary in multi-channel displays to separate illumination and ON-beams with normally reflected ON-beams. In contrast to the often orthogonal and normal superposition seen in the prior art, which in many cases can be illustrated comparatively easily in two-dimensional representations of their arrangements, the spatial complexity resulting from the non-normal direction of the ON-beams is greatly increased. Our aim was to find a solution for the requirements put by this spatial complexity.

MOEMS Geometry

To understand the present invention, it is important to know the geometry of the MOEMS (in earlier literature often without the "O"). These MOEMS comprise an array of micro mirrors, which are deflectable ("tiltable") around a mirror deflection axis. In many current Multi-MOEMS displays a MOEMS by Texas Instruments, the so-called DMD (digital mirror device) is used (e.g. U.S. Pat. No. 5,535,047). The geometry of illumination beam, reflected image beam (ON-beam) and the OFF-beam, reflected in a direction different from the ON-beam, is shown in FIG. 10a,b.

The DMD comprises an array of quadratic micro mirrors, with a side length below 20 µm, which are deflectable around a deflection axis which is arranged at the diagonal of the mirrors. In FIG. 10a,b the individual mirrors are omitted to simplify the drawing. The plane of the whole mirror array is indicated by the circle (100). The normal (101) to this plane is indicated by the dashed line. The DMD is a bistable system: the single mirrors are stable in an ON- and in an OFF-state, while the mid-position between ON- and OFF-state, parallel to the plane (100) of the array, can not be addressed or stabilized. Each micro mirror can be deflected by the deflection angle $\beta$, (which currently is 12°) from the instable mid-position to the ON-state, which is described in the drawing by the normal (102) of the single mirror surface in the ON-state. The OFF-state is the second stable state, and it is characterized by the same deflection angle $\beta$, but opposite to the side of the ON-deflection. The OFF-state is described by the normal (103) of the single mirror surface in the OFF-state. An illumination beam, incident on the array, can be reflected as ON-beam (12) into a direction to be displayed, or can be reflected as OFF-beam (13) into a direction to be disposed. In Multi channel displays with MOEMS according to the state of art (e.g. DE10361915, U.S. Pat. No. 7,403,320, U.S. Pat. No. 7,466,473, U.S. Pat. No. 7,817,329, U.S. Pat. No. 7,134,416, U.S. Pat. No. 7,375,896, US2009/0027624, US2009/0027624 [col. 3, lines 60-62], U.S. Pat. No. 5,535,047) the illumination is chosen such that the modulated ON-beam (12) is reflected in a direction normal to the plane (100) of the micro mirror array, which is given by the normal (101) in FIG. 10a. This normal direction of the modulated beam (12) is a result of the illumination beam (11) being incident in the plane defined by the normals (102, 103) of the mirrors in the ON- and OFF-states with an exact angle of $\beta$ to the normal (102) of the mirror in the ON-state (and 2*$\beta$ to the normal (101) of the array) For the understanding of our disclosure it is important to see that all beams (11, 12, 13), and all three normals (101, 102, 103) are in a common plane. This is the most simple spatial geometric arrangement.

In displays with more than one MOEMS modulator the direction of the mirror deflection axis, which includes an angle of 45° to the rows or columns and is the diagonal of the mirrors, becomes an additional burden. All arrays produced so far have a rectangular, non-quadratic shape, with an array width (corresponding to the image width) being larger than the array height (corresponding to image height). This makes the DMD, when input and output beams are taken into account, a stereo-isomer (it shows "handedness"). Thus, for the superposition of DMDs a folding additional to the folding of one channel at the superposition layer is required, because there has to be either the same number of foldings in each channel or an even-numbered difference of the number of foldings (U.S. Pat. No. 5,638,142, U.S. Pat. No. 6,250,763B1). Only by using stereo-isomeric pairing, internally symmetric MOEMS, or in very special arrangements an uneven number of foldings in the two channels is possible (DE 10361915). Solutions of the state of the art which meet these requirements include complex arrangements, e.g. an assembly made of several prisms (Tri-chroic Prism Assembly, TPA, U.S. Pat. No. 7,396,132, US2007/0229770), or particular arrangements of the MOEMS with selectively modeled TIR-prisms, as described in U.S. Pat. No. 7,375,896.

The separation of the incident beam and the modulated beam in Multi-MOEMS displays according to the state of the art is shown in FIG. 10b.

Because the angle between the illumination beam incident on the micro mirror array and the reflected modulated ON-beam is only 2*$\beta$, in all Multi-MOEMS displays of the state of the art at least one TIR-prism (17) is used to separate these beams. FIG. 10b shows a situation where a total internal reflection layer folds the incident beam (11) and transmits the modulated beam (12). In some arrangements (not shown) the TIR-prism is used in an inverted way (comp to FIG. 10b), whereby the incident beam transmits the TIR-layer and the modulated beam is reflected (US2002/0021505, U.S. Pat. No. 7,360,905). Although the angles of the relative TIR-layers are chosen for the specific requirements, the normal direction of the modulated beam is used throughout.

While recent Multi-MOEMS displays cannot do without beam separation systems, in the state of the art there are single MOEMS displays, which get along without these separation systems, because they use a different illumination beam arrangement (e.g. US2007/0247591, U.S. Pat. No. 6,540, 361). The application of a DMD, in which the modulated beam leaves the modulator in a non-normal direction provides a larger angular distance between the axis of the illuminating and the modulated beams. This application is shown in FIG. 10c.

Similar to FIG. 10a, the incident, the modulated ON- and the OFF-beam, as well as the normals of the mirror array (101) and the normals (102, 103) of the planes of single mirrors in their ON- and OFF-state are shown. Again, the geometry of a recent DMD and thus the same angles for ON- and OFF deflections are used as in FIG. 10a. Here, they are described as ON-deflection angle β1 and OFF-deflection angle β2, because MOEMS have been disclosed in the state of the art which have different ON- and OFF-deflection angles, and because only the ON-deflection angle β1 becomes relevant for the disclosure of our invention. The ON-beam (12) includes an angle α with the normal of the normal (101) of the plane (100) of the micro mirror array. In this art, a mid-sagittal direction is preferred for the modulated ON-beam (12). A sagittal plane can be thought to be spanned by a vertical line through the array—(parallel to the columns of the array, not shown) and by the normal (101) of the plane of the array, the mid-sagittal plane would accordingly be spanned by a vertical line in the center of the array and the normal (101). This leads to several geometric consequences for the illumination beam and for the OFF-beam. First, to achieve the preferred direction of the reflected ON beam, the illumination beam (11) has to be directed onto the array in a plane, which is not identical with the plane spanned by the normals (101, 102, and 103). This is indicated by the different lines connecting the three normals (101, 102, 103) and the lines from the illumination beam (11) to the modulated ON-beam (12). The choice of the angles and planes to be used for illumination (and also for the disposal of the OFF-beam) requires much more thought than in FIG. 10a. The plane for the input beam is determined by the axis of the modulated beam (12) and the normal (102) of the surface of the single mirrors in the ON-state. The angle included between the normal of the incident beam (11) and the normal (102) can not be expressed as a linear combination of the angles α and β1, because they are not in the same plane. We therefore introduce the illumination angle δ, which directly specifies the angle between the incident illumination beam (11) and the normal (102) of the mirror surface in the ON-state. A fourth angle γ could be used to specify the angle between the incident beam (11) and the normal (101) of the array. Here we only use it to emphasize that γ is not the sum of δ and β1. Likewise, δ is not the sum of α and β1, but smaller. If the requirement of a mid-sagittal ON-direction in this prior art for single MOEMS displays is released, it becomes evident that the relations between δ, α and β1 remain open and δ could even be chosen to be smaller than β1. For the disclosure of our invention it is to be noted here already that the angle δ can exceed the ON-deflection β1. Because the incident and the reflected beams include an angle of 2δ, the separation of incident and reflected ON-beams can be significantly enhanced above the 2β (resp. 2β1) condition with a normally reflected ON-beam.

Not described in the state of the art is the illumination scheme shown in FIG. 10d. Although this is a special case of the general concept explained in FIG. 10c, it is relevant for some embodiments of the disclosure, and will be referred to when these are described.

In contrast to FIG. 10c, the illumination geometry has been changed to show a special choice of incidence, where all beam axes and all normals are in a common plane, quite similar to the geometry shown in FIG. 10a. This includes the incident beam (11), the normals (102, 103) of the mirror in ON- and OFF-state, the normal (101) of the plane (100) of the micro mirror array, the ON-beam (12) and also the OFF-beam (13) used to dispose light at dark image points. This is an substantial simplification of the general situation which facilitates the design requirements especially for Multi-MOEMS displays, where there has to be a clean separation of all those beams. The common plane is indicated by the sector circle line spanning from illumination beam (11) to the OFF-beam (13). The common plane has the following consequence: in FIG. 10d, the illumination angle (δ) consists of the ON-deflection angle (β1) plus the zenith angle (α). The incident illumination beam (11) is separated by an angle of 2*δ from the ON-beam (12), a separation which is exactly 2*(β1+α), while in a less than optimal geometry (comp. FIG. 10d) this distance is smaller, and in fact, could be even smaller than 2*β1, which is the separation in normally reflected ON-beams in Multi-MOEMS displays according to the state of the art. The optimized angle separation could, as an example, easily be realized with a new MOEMS architecture according to the state of the art. While recent DMDs by Texas Instruments have a diagonal deflection axis, MOEMS disclosed by Fraunhofer comprise mirrors, which are tiltable around an deflection axis orthogonal to the mirror. Depending on the position of the modulator and the image, these mirrors rotate either from left to right, or from top to bottom (and vice versa). Optimized angle separation can, however, also be realized with the DMD type of MOEMS.

Multi-MOEMS displays with this type of illumination are disclosed by this paper, but our invention is not limited by this type of illumination. The invention however depends on a illumination which improves the discrimination of IN- and ON beams as compared to that described in detail in multi-MOEMS displays with normally reflected ON-beams according to the state of the art. These two illumination conditions of the prior art and of the disclosed display is compared in FIG. 10e.

FIG. 10e illustrates the consequence of the illumination system with an increased separation angle between the illumination beam and the reflected modulated beam, which is used in our invention of Multi-MOEMS displays (11L, 12L) and compares it to the illumination in Multi-MOEMS displays according to the state of the art (11S, 12S). Angle separation has a direct consequence on the F-number of the system. The F-number of projective devices has been described by the equation F1 (F-number of the illumination light path)=F2 (F-number of projection light path)=1/(2 (2*NA)), and the numerical aperture (NA) being given by the sine of the (ON-) deflection angle. This results, when using a recent DMD with a deflection angle of 12° with an F-number of appr. 2.4. While the consequence of the deflection angle on the F-number is common knowledge among those known in the art, the effects of optimizing the distance between ON- and IN beams with an alternative illumination path has not been realized in projection devices with more than one spatial light modulator. As an example, provided with our figures, in the illumination system shown in FIG. 10d,e, an assumed azimuth angle (α) of 5° and a resulting illumination angle (δ) of 17° (in a state of the art DMD system with 12° deflection) leads to an F-number of 1.7, which is a significant improvement. The smaller circles indicate the maximum illumination cones possible on the illumination beam (11S) in prior art compared to the much larger circles which indicate the maximum illumination cones in the optimized separation angle illumination (11L). There are several limitations, e.g. the direction of the ON-beam (13L), to increasing the separation angles, which however are not relevant to the core of the invention and will therefore not be discussed here. Alternatively to improving the numerical aperture, the larger separation angle might render a TIR-prism for supporting the separation unnecessary.

Multi-MOEMS Display Arrangements: Layout in the State of the Art.

FIGS. 11 and 12 exemplarily show a 2-MOEMS and a 3-MOEMS display according to the state of the art with at least one TIR-prism to separate the illumination from the modulated beam and with normally reflected ON-beams. In FIG. 11 a schematical illustration of a 2-MOEMS display, a planar arrangement of two TIR prisms (17, 27) a split layer (74) and a superposition layer (14), is shown. In this 2-channel display system with two MOEMS (1,2) split and superposition are orthogonal and normal. Although the drawing is reduced to a top view, it is evident that the illumination beams (11, 21) are guided to the mirror arrays such that the modulated ON-beams (12, 22) are reflected in the direction of the normals (101, 201) of the planes of the two mirror arrays. The TIR-prism, used to reflect the illumination beams onto the MOEMS, transmit the ON-beams towards the superposition layer (14) and thus supports the beam separation with this comparatively small separation angle of normal ON-beam reflection. A normal superposition at (14) superposes the two ON-beams, and a superposition beam (4) of the two channel specific sub-beams (15, 25) leaves the arrangement to be displayed.

FIG. 12 shows schematically a widely-used trichroic prism assembly in a side view (FIG. 12a) and a topview (FIG. 12b). Here, only the main characteristics relating to our invention are described. FIG. 12a shows a common input beam (71), which is reflected into the assembly by an input TIR-prism (17). Two dichroic layers (14, 24), located at the back of two triangular prisms, split a read and a blue beam as illumination beams for the MOEMS (2,3), while a green illumination beam (11) transmits both split layer and becomes incident on the MOEMS (1). For a better readability, the illumination beams (21, 31) for the MOEMS (2,3) are omitted in the drawing, the first illumination beam (11) can be seen in FIG. 12a. The illumination beams are guided such onto the mirror arrays that the modulated ON-beams (12, 22, 32) are reflected normally from the plane of the mirror arrays, parallel to the normals (101, 201, 301) of the planes of these arrays. The modulated beams (22, 32) are folded two times, first by an unspecific total reflection, and than by the same dichroic layers (14, 24). These layers, formerly used to split the illumination beam, are now used to superpose the modulated beams. The green ON-beam (12) transmits all these reflection layers. Both superposition steps, the superposition of the first and second ON-beams (12, 22) at the superposition layer (14) and the superposition of the third ON-beam (32) with the first two at the superposition layer (24) the are not orthogonal, but are normal. The superposed beam (4, consisting of 3 sub-beams) finally transmits the input TIR-prism (17).

SUMMARY OF THE INVENTION

The separation angle between the illumination beam and the reflected modulated ON-beam is a critical parameter of the optical and system design of MOEMS displays. Under the conditions described above, a non-normal reflection of the modulated ON-beams has the potential advantage of increased separation angles between In- and On beam, and between ON-beam and OFF-beam. We disclose a Multi-MOEMS display with increased separation angles due to non-normal ON-beam reflection. The Multi-MOEMS display comprises at least two MOEMS. We uncover systems which meet multiple requirements For the geometric arrangements of the MOEMS and all beams. The Multi MOEMS display also comprises a light guidance for each MOEMS, in which the axes of the incident illumination beams (11, 21) include illumination angles ($\delta$) with the normals of single mirrors of the MOEMSs in their ON-state (102, 202), which are larger than the ON-deflection angle ($\beta 1$) between the normals of the single mirrors in the On-state (102, 202) and the normal of the planes (100, 200) of the micro mirrors. As a consequence, the illumination beams (11, 21) and the reflected modulated ON-beams (12, 22) have separation angles which are larger than twice the ON-deflection angle ($\beta 1$). As a Further consequence, the ON-beams (12, 22) include zenith angles ($\alpha$) with the normals of the planes of the mirror arrays (100, 200).

A second angle, the azimuth angle ($\phi$), which is derived as a normal projection (121, 221) of the ON-beams onto the mirror planes has to be matched for all ON-beams. The invention is generally based on the disclosure of possible superposition conditions which have to be fulfilled with the non-normal reflection of the ON-beams—independent on the MOEMS-design used. The disclosed Multi MOEMS display therefore comprises an arrangement of the superposition system and of the first and second micro mirror arrays in which the superposition layer is configured to superpose the two ON-beams, and in which a common superposition image is formed in a common plane. The disclosed system also comprises at least a light source and projection optics configured to project the superposition image. The disclosed display is generally independent on the architecture of the MOEMS used. The application of the widely-used DMD by Texas Instruments is possible; the adoption of new MOEMS-geometries (EP2100848, U.S. Pat. No. 7,573,634) may simplify the arrangements for some embodiments of the invention (comp. FIG. 10d).

The Multi-MOEMS display can reduce complexity, costs, and weight, e.g. seen in the glass prism arrangements of TPAs or other complex arrangements according to the state of the art. In this aspect, the invention enables simpler and smaller displays with reduced weight and cost. In a second aspect, the larger separation angle can also be used to improve the optic quality, e.g. an improved numerical aperture, respectively. a lower F-number.

BRIEF DESCRIPTION OF THE DRAWINGS

FIG. 5b Fourth embodiment: 2-MOEMS display, common illumination beam without TIR-prisms and normal superposition.

DESIGNATOR LIST

Figure 1:
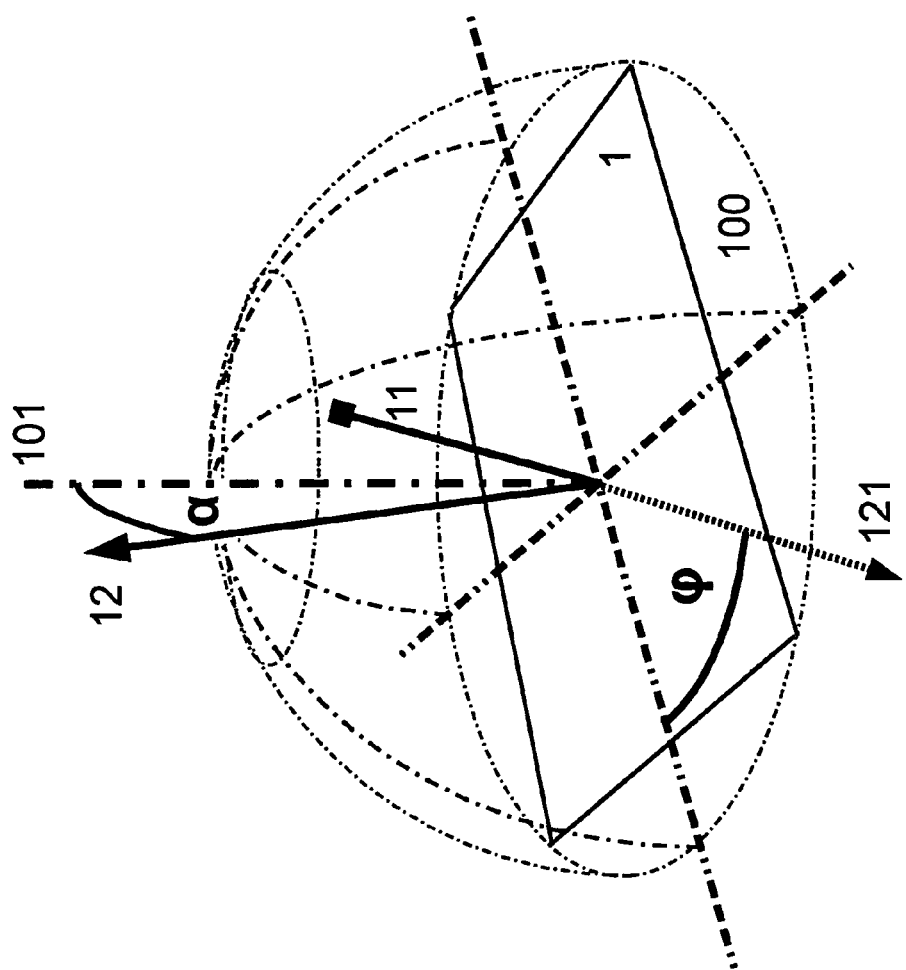
FIG. 1a Geometry of incidence and reflection at a MOEMS-surface, and designation of angles FIG. 1b Transformation of the angle $\phi$ by reflections, and also by superposition FIG. 1c Superposition of non-normally reflected ON-beams and the planes of sub-images FIG. 2a First embodiment: 2-MOEMS display, normal superposition with one reflection FIG. 2b First embodiment: 2-MOEMS display, normal superposition with two foldings in one of the channels FIG. 2c First embodiment: 2-MOEMS display, normal superposition with one folding in both channels FIG. 2d First embodiment: 2-MOEMS display, normal superposition with two crossed superposition layers FIG. 3a Second embodiment: 3-MOEMS display, normal superposition with two crossed superposition layers FIG. 3b Second embodiment: 3-MOEMS display, normal sequential superposition at two superposition layers FIG. 3c Second embodiment: 3-MOEMS display, normal sequential superposition at two superposition layers and an additional reflection surface FIG. 3d Second embodiment: 3-MOEMS display, TIR-prisms and normal superposition FIG. 4a Exemplary schematic illustration of illumination (tele) and OFF-beam dump in the first embodiment FIG. 4b Exemplary schematic illustration of illumination (non-tele) and OFF-beam dump in the first embodiment FIG. 5a Third embodiment: 2-MOEMS display, common illumination beam, TIR-prisms and normal superposition.
Figure 1:
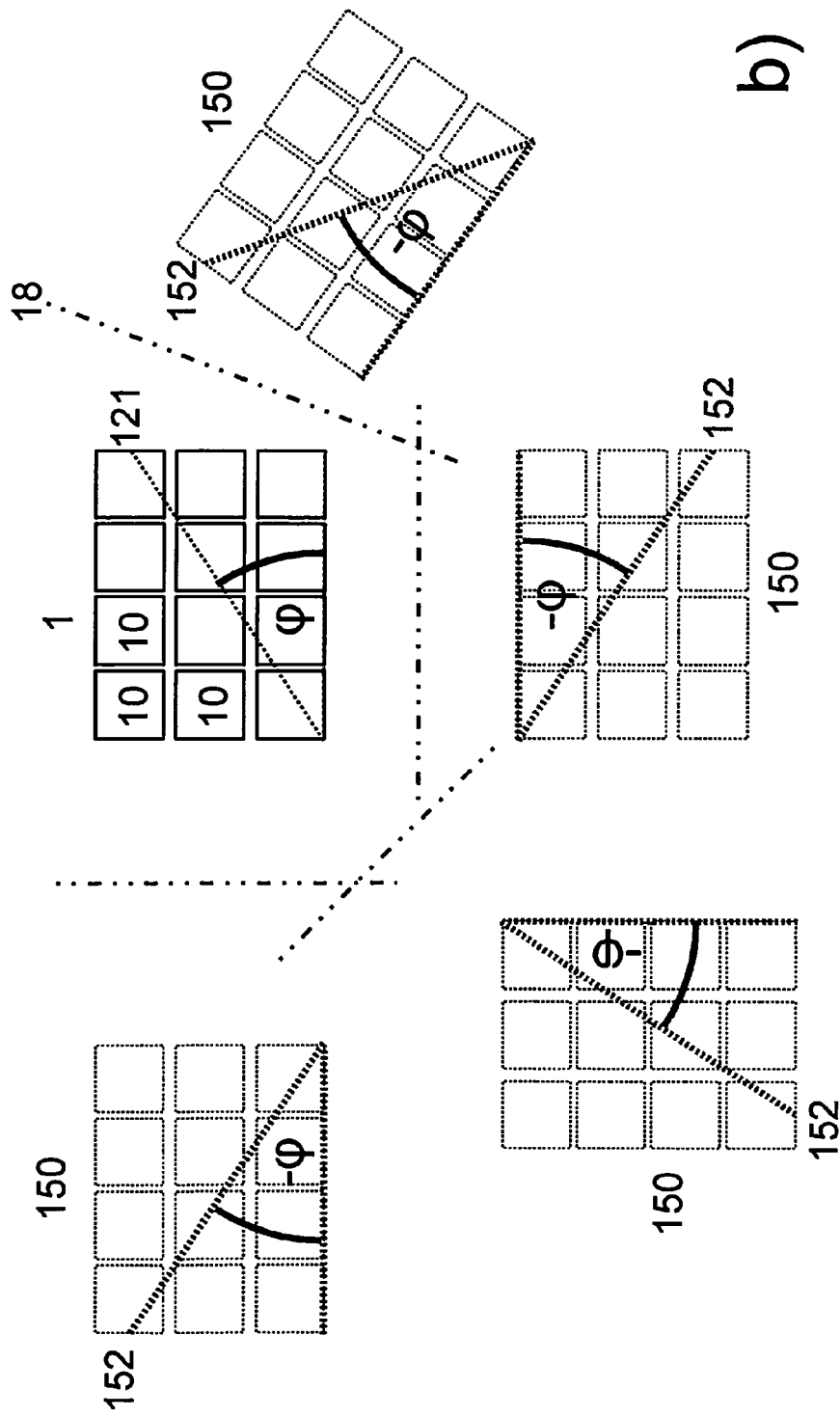
Figure 1:
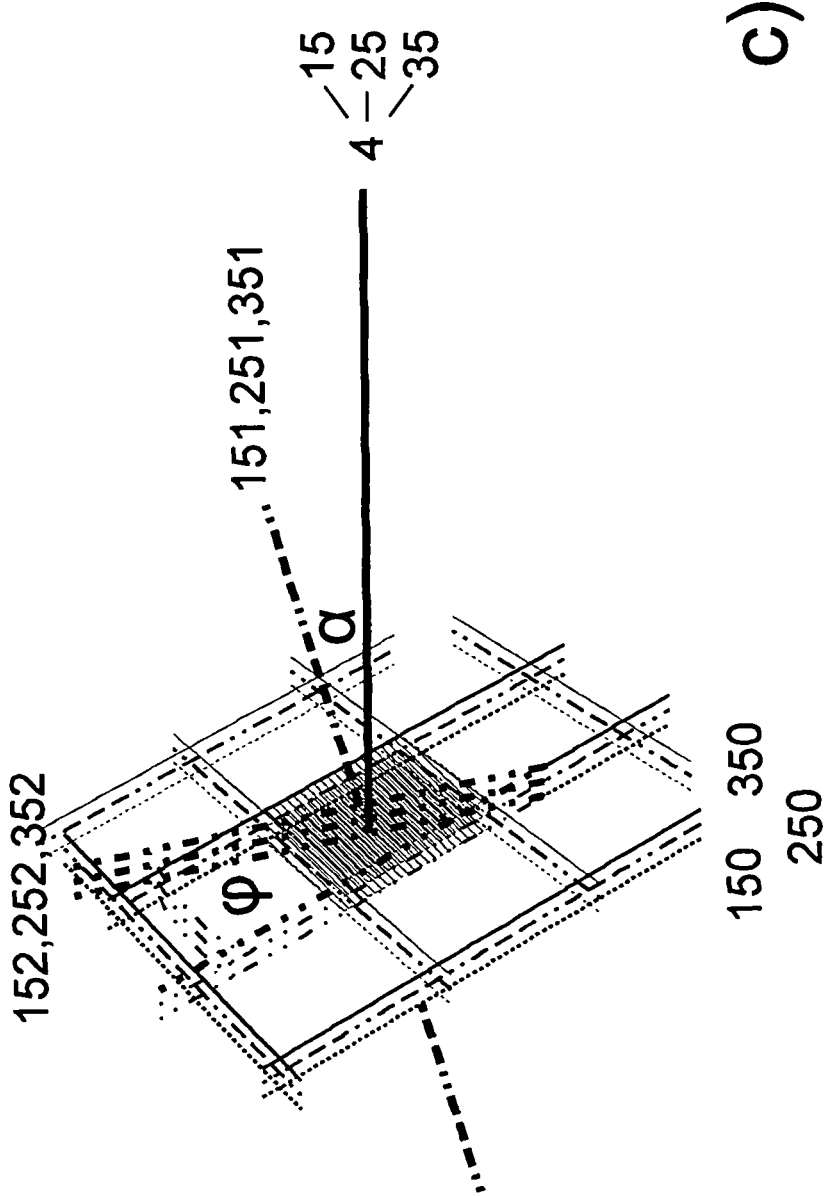

Used in all Drawings (1) micro mirror array of the first spatial light modulator
(1) micro mirror array of the first spatial light modulator
(10) single mirror of the micro mirror array of the first spatial light modulator
(100) plane of the micro mirror array of the first spatial light modulator
(101) normal to the plane of the micro mirror array of the first spatial light modulator
(102) normal to the plane of the single micro mirror (10) in its ON-state
(103) normal to the plane of the single micro mirror (10) in its OFF-state
(11) illumination beam incident on the first spatial light modulator
(12) modulated ON-beam of the first spatial light modulator
(121) normal projection of the modulated ON-beam (12) onto the plane (100)
(13) OFF-beam of the first spatial modulator
(14) first superposition layer
(15) first partial image beam: the portion of the first ON-beam (12) which is reflected at the first superposition layer (14)
(150) superposition image plane, derived from the plane (100) by at least a reflection at the first superposition layer (14)
(151) normal to the plane (150)
(152) normal projection of the first partial image beam (15) onto to the superposition image plane (150)
(16) portion of the first ON-beam (12) which is transmitting the first superposition layer (14)
(17) TIR-prism (optional) for the separation of IN- (11) and ON-beam (12) at the first image modulator
(18) means of folding (optional) for the first ON-beam (12)
(2) micro mirror array of the second spatial light modulator
(20) single mirror of the micro mirror array of the second spatial light modulator (2)
(200) plane of the micro mirror array of the second spatial light modulator (2)
(201) normal to the plane of the micro mirror array of the second spatial light modulator
(202) normal to the plane of the single micro mirror (20) in its ON-state
(203) normal to the plane of the single micro mirror (20) in its OFF-state
(21) illumination beam incident on the second spatial light modulator
(22) modulated ON-beam of the second spatial light modulator
(222) normal projection of the modulated ON-beam (22) onto the plane (200)
(23) OFF-beam of the second spatial modulator
(24) second superposition layer
(25) second partial image beam: the portion of the second ON-beam (22) which transmits the first superposition layer (14)
(250) superposition image plane, derived from the plane (200)
(251) normal to the plane (250)
(252) normal projection of the second partial image beam (25) onto to the superposition image plane (250)
(26) portion of the second ON-beam (22) which is reflected at the first superposition layer (14)
(27) TIR-prism (optional) for the separation of IN- (21) and ON-beam (22) at the second image modulator
(28) means of folding (optional) for the second ON-beam (22)
(29) X-Polarizer
(3) micro mirror array of the third spatial light modulator
(30) single mirror of the micro mirror array of the third spatial light modulator
(300) plane of the micro mirror array of the third spatial light modulator
(301) normal to the plane of the micro mirror array of the third spatial light modulator
(302) normal to the plane of the single micro mirror (30) in its ON-state
(31) illumination beam incident on the third spatial light modulator
(32) modulated ON-beam of the third spatial light modulator
(33) OFF-beam of the third spatial modulator
(35) third partial image beam: the portion of the third ON-beam (32) which transmits the second superposition layer (24)
(350) superposition image plane, derived from the plane (300)
(351) normal to the plane (350)
(352) normal projection of the third partial image beam (35) onto to the superposition image plane (350)
(37) TIR-prism (optional) for the separation of incident (31) and ON-beam (32) at the third image modulator
(38) means of folding (optional) for the third ON-beam
(39) means for color splitting
(4) superposed beam, derived from at least two ON-beams
(6) "dump", OFF-beam disposal

(71) illumination beam common to more than one image modulator
(74) splitting layer for the illumination beam (71)
(78) means for reflection
(9) projection optics
(91) optical axis of the projection optics

DETAILED DESCRIPTION OF THE DRAWINGS

Figure 10:
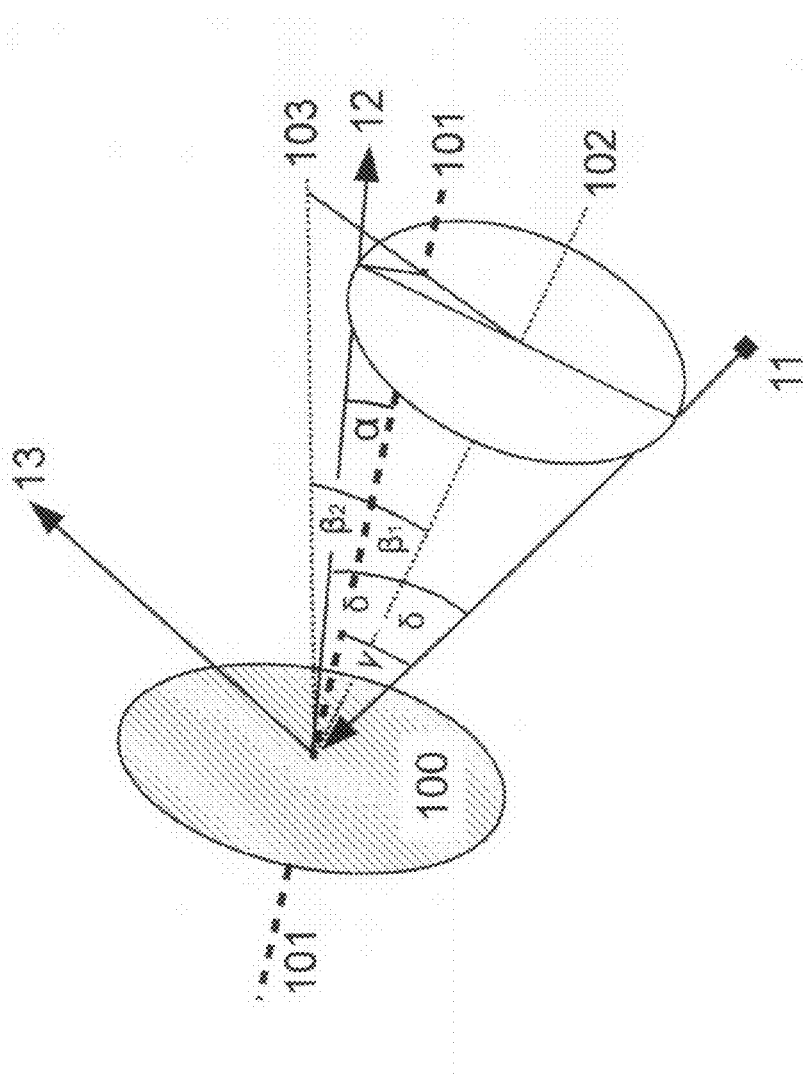
FIG. 10a Optical geometry of a deflectable mirror with normal ON-beams (prior art in single and multiple MOEMS displays)
FIG. 10b Illumination and normal ON-beam separation with a TIR-prism (prior art).
FIG. 10c Optical geometry of a deflectable mirror with non-normal ON-beams (prior art in single MOEMS displays)
FIG. 10d Illumination direction for optimal incident—and reflected ON-beam separation (special case of FIG. 10c, disclosed with this paper)
FIG. 10e Numerical aperture and F-number for the illumination described in FIG. 10d.
Figure 10:
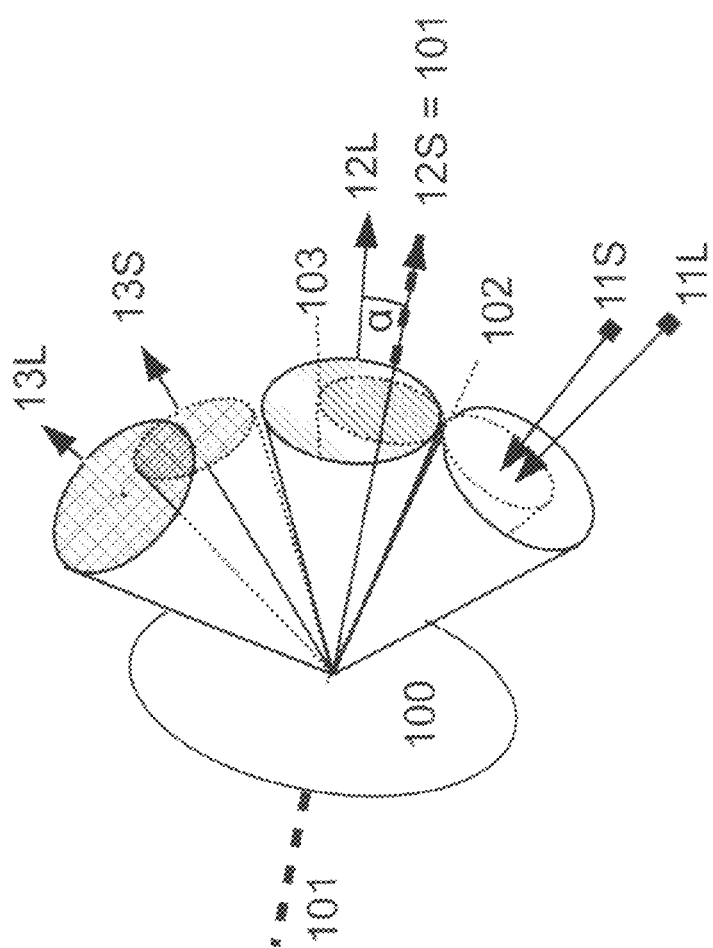
Figure 11:
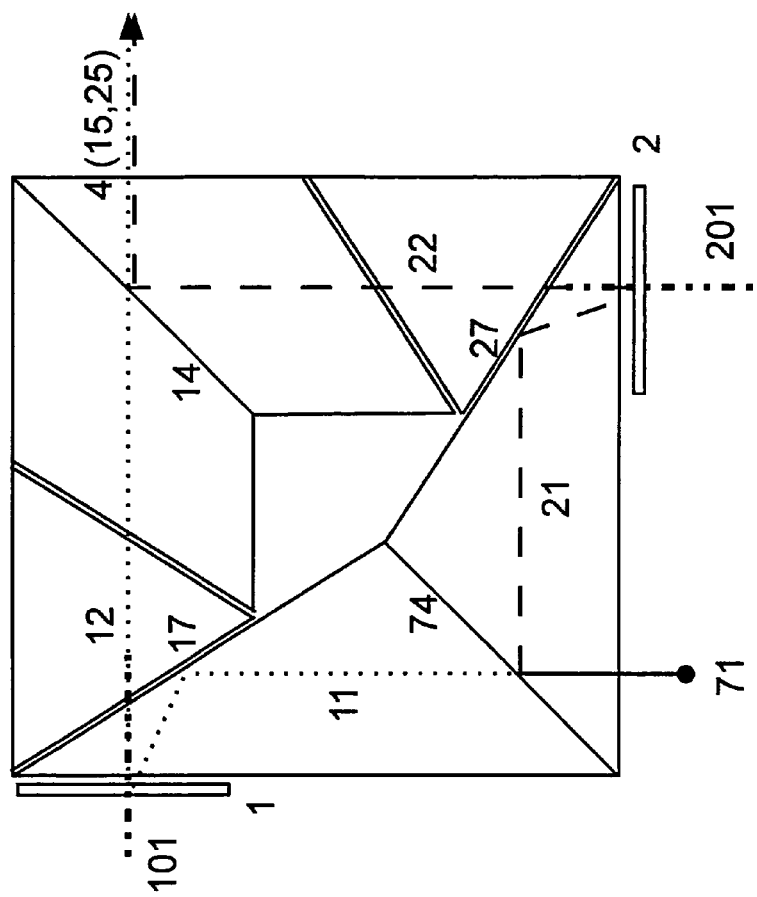
FIG. 11 Prior art: 2-channel MOEMS-display
Figure 12:
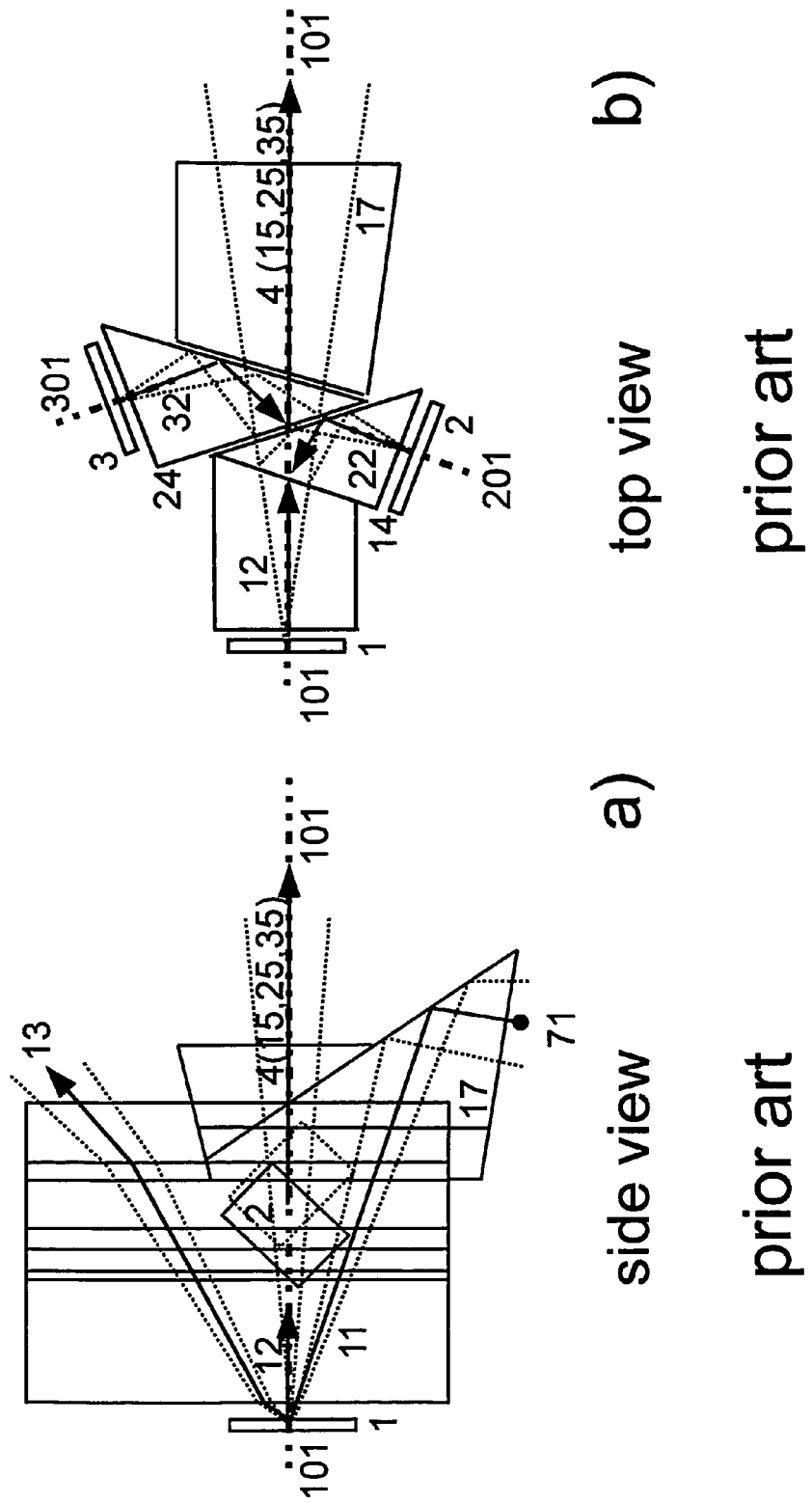
FIG. 12a,b Prior art: 3-channel MOEMS-display

FIG. 10d shows an optimized geometry of illumination optics with a single mirror of a MOEMS with an array of deflectable mirrors which resembles many characteristics of the geometry that has been described in FIG. 10c, and which is used in the state of the art in single MOEMS displays. FIG. 10d however shows a light guidance which is optimized for an large angle between the incident illumination beam (11) and the ON-beam (12), reflected in the ON-state of the single mirrors.

In contrast to FIG. 10c, the illumination geometry has been changed to show a special choice of incidence, where all beam axes and all normals are in a common plane. This includes the incident beam (11), the normals (102, 103) of the mirror in ON- and OFF-state, the normal (101) of the plane (100) of the micro mirror array, the ON-beam (12) and also the OFF-beam (13) used to dispose light at dark image points. of the micro mirror array (1). As a reference for this angle the array of micro mirrors is used, which consists of columns and rows. $\phi$ is defined as the angle between the rows and the normal projection (121), whereby the convention $-90° < \phi \leq 90°$ limits the angle sufficiently to define all possible directions of the ON-beam.

FIG. 1b shows how the geometry is changed by a reflection of the ON-beam, which is required for any superposition in at least one of the superposed channels. The mirror array (1) consisting of many single mirrors (10) is transformed to (150) by the reflection. A dash-double dotted line represents the mirror axis of the reflection (18). The normal projection (121) is transformed to a virtual normal projection (152). In the plane (150) of the transformed mirror array this transformed projection has an azimuth angle ($\phi$) which keeps its original size, but has an inverted sign. The position of the mirror axis (dot-dash lines) has no influence on this sign inversion. The system of micro mirror array (1) and the normal projection (121) of the ON-beam (ON-beam not shown) can be described as a stereo-isomeric system, as long as the azimuth angle $\phi$ is different from 0° and different from 90°.

Multi-MOEMS displays according to our invention require not only a defined axis of the ON-beams to be superposed to a common superposition axis for all involved partial image beams, but also a match of the arrangements of the micro mirror arrays with respect to the superposition layer(s). The projection system projects a common superposition image, which consists of virtual and, in some cases, of real partial images. The planes of these partial images (150, 250, and 350) in the example of a 3-MOEMS display are shown in FIG. 1c. According to our invention, all these planes are located at a common plane. In FIG. 1c, for the sake of a understandable visualization, the partial images are shown in close parallel planes. The common plane can be described by the three identical normals (151, 251, 351) of the partial image planes. The superposition beam (4) which consists of the partial image beams (15, 25, 35) derived from three ON-beams has the same zenith angle ($\alpha$) with the normal of the superposition image plane as the individual ON-beams. Moreover, a good superposition image usually requires the rasters of the mirror arrays (resp. single mirrors) of the partial images to closely map to the same location. The examples shows all layers to have the same azimuth angle ($\phi$). A sign inversion of the azimuth angle is also possible. In the case of quadratic single mirrors, (e.g. with DMDs) there could also be an alignment of the rows of one of one partial images with the columns of another one of the partial images. This would usually not lead to a complete overlap, but to a partial overlap of the modulated images. The preferred match of the rasters is only possible if the normal projection of the ON-beams have an azimuth angle with the rows or columns with the same size as $\phi$ (compare FIGS. 1a and b). Of course, other raster geometries can also be superposed. The identical position of superposed pixels indicates that the ON-beams of the different channels have traveled approximately the same optical path lengths from the micro mirror arrays to the superposition image.

All embodiments described as exemplary realizations of the invention in the following figures meet all requirements for superposition which are discussed with FIGS. 1b and 1c. All drawings show schematically principles of our invention; they are not drawn to scale. While the drawings are necessarily 2-dimensional representations, the Multi-MOEMS displays are 3 dimensional arrangements. Please note that the lines shown in these drawings need not to be—and in several cases do not—indicate directions parallel to the drawing plane, but are projections into this plane.

Figure 2:
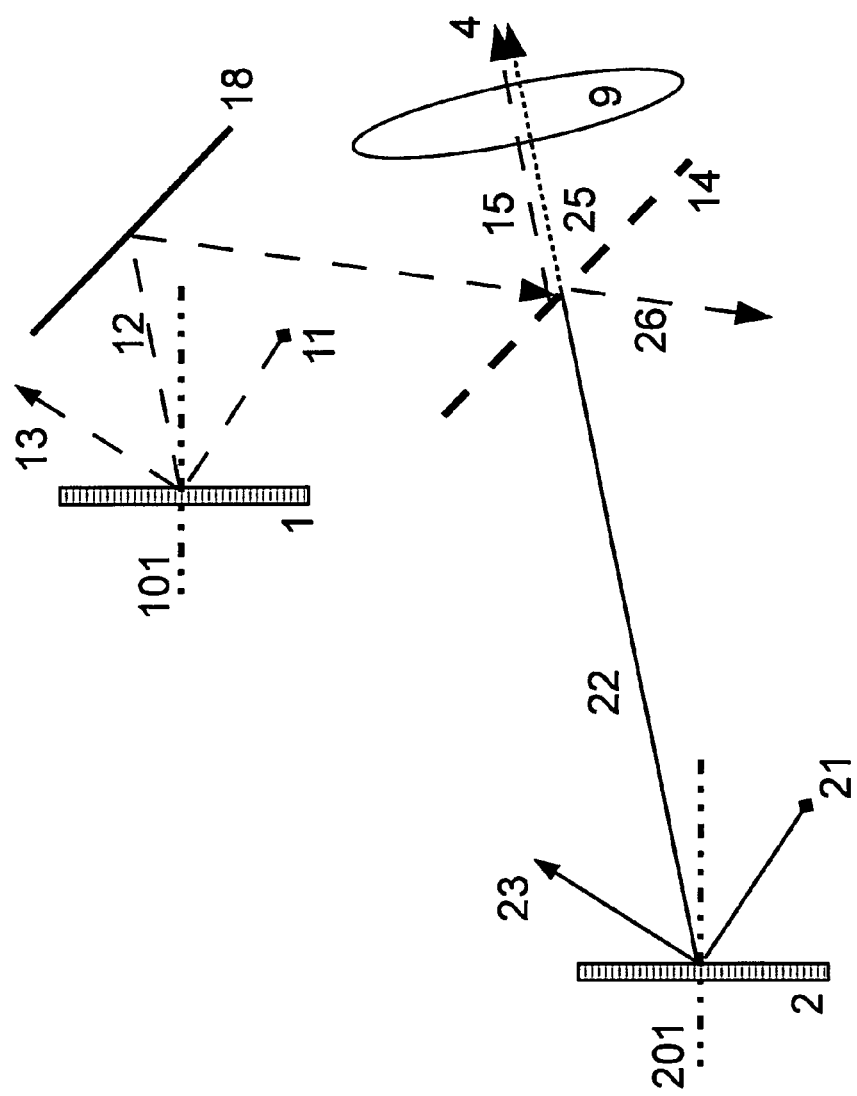

FIG. 2a schematically shows the principles of a first embodiment of a 2-MOEMS display according to our invention. It comprises two spatial light modulators respectively their mirror arrays (1, 2), which modulate the partial image information of the two channels. A first illumination beam (11) is guided to a first mirror array (1) such that it incides on the mirror with an illumination angle $\delta$ to the normal (101) of the mirror in its ON-state (comp. FIG. 1c,d,e). This illumination angle $\delta$ is larger than the ON-deflection angle $\beta 1$ of the mirrors, and therefore, according to the laws of reflection, the ON-beam is reflected in a direction which is different from the normal (101) of the plane (100) of the mirror array, and it includes an zenith angle $\alpha$ with this normal. A second illumination beam (21) is guided, again with an illumination angle $\delta$, which is also larger than the ON-deflection angle $\beta 1$ onto the second mirror array (2). The second ON-beam (22) is reflected from the second mirror array (2) in a direction, which includes the same zenith angle $\alpha$ with the normal (201) of the plane of the second mirror array.

The first mirror array is positioned such that a portion (15) of the first ON-beam (12) is reflected by a superposition layer (14) into a superposition axis. The second mirror array is positioned such that a portion (25) of the second ON-beam (22) transmits the superposition layer in the same superposition axis as the reflected portion (15) of the first ON-beam (12), so that a superposition beam (4) is formed. Like all superposition layers, the superposition layer (14) reflects light of a certain light property and transmits light with a different property. FIG. 2a shows the first and second ON-beams to have the same properties (indicated by a solid line), which are partially reflected and partially transmit the superposition layer. In the example shown, the reflected portion (15) of the first ON-beam receives a certain specificity with the reflection (indicated by the dashed line), and the second portion (16) of the first ON-beam (12) transmits the superposition layer (14) with light properties (indicated by the dotted line) which transmit the superposition layer (14). Reciprocally, the superposed portion (25) of the second ON-beam (22) has the transmitting specificity (dotted line). In the example shown, large portions of the modulated ON-beams are lost for superposition. In many cases, and shown in later examples of embodiments, it is preferable to choose the light properties of the incident beams to match the characteristics of the superposition layer to minimize light loss during superposition. As FIG. 2a shows, however, this is not a prerequisite, and the two channels could get channel specific information (be it polarization, spectral composition or other characteristics) only at superposition.

For the quality of the superposition image an exact overlay of the partial images is important. As has been described, the axes of the reflected (15) and of the transmitting (25) beams have to coincide in the superposition beam (4). Secondly, and shown in FIG. 1c, it is preferable that the planes (150, 250) of the partial images of the superposition image are parallel, and that the normals (151, 251, in FIG. 2a these coincide with the normal of the micromirror array 201) to theses planes include the same zenith angle ($\alpha$) with the superposed beam 4 (consisting of 15 and 25). For a superposition which retains the spatial resolution of the single imagers, a certain orientation of the image rasters is preferred. This is explained in FIG. 1c.

The superposition image, in FIG. 2a consisting of a virtual image (in plane 150) and a real image (in plane 250 which is identical to the plane 200 of the mirror array 2) is projected with projection optics (9). In same cases, the optical axis of the projections optics may include the angle $\alpha$ with the axis of the superposition beam (4).

In certain cases, e.g. if internally symmetric MOEMS are used, the axes of all beams shown in FIG. 2a could be parallel to the drawing plane. Even the normals of the planes of the micro mirror arrays, as well as the normal of the superposition layer, could be parallel or within the drawing plane. In that case, the superposition plane (spanned by first and second ON-beams (11, 12) is parallel to the drawing plane. We call this superposition situation, where the beams to be superposed and the normal of the superposition image are coplanar, a "normal superposition". In many cases of the invention, and specifically described with some embodiments our invention, the normal of the superposition layer is not within the superposition plane, which we call "non-normal superposition". Normal superposition can also be achieved with stereo-isomeric MOEMS like the DMD, which has no internal symmetry axis, as long as a right- and a left-handed stereo-isomer are used. In this technique, which we call stereo-isomeric pairing, the ON-beams and the normal of the superposition layer are parallel to the drawing plane. If a geometry like that shown in FIG. 10c is chosen, the incident beams (11, 21), the OFF-beams (13, 23) and the normals of the mirror arrays (101, 201) are not parallel to the drawing plane. Independent on the symmetry of the MOEMS, the coplanar arrangement of the partial superposition images and the requirements concerning the azimuth angle ($\phi$) have to be met. If the ON-beams are led to the superposition layer without additional foldings, the mirror arrays are positioned symmetrically to the superposition layer.

2-MOEMS displays according to our invention are well suited to display stereoscopic information. In this case, the superposition layer could be a polarization beam splitter (PBS), and with the addition of a color-wheel or another means for providing sequential color information, the 2-MOEMS display could serve as a color-stereoscopic projection device. Of course, there are many other codings than polarization within the scope of our invention and the embodiment shown in FIG. 2a. The 2-MOEMS display could e.g. use a multiband beam splitter as a superposition layer (e.g. U.S. Pat. No. 7,001,021), again for a stereoscopic display, or any other splitter for other purposes.

FIG. 2b shows a first variant of the embodiment of a 2-MOEMS display. With the addition of a reflection surface, e.g. an unspecific mirror (18), it is a simple extension of the arrangement shown in FIG. 2a. The reflection at the mirror (18) folds the image modulated by the mirror array (1) of the first image modulator to its mirror symmetric form. This additional reflection can counteract the reflection which happens at the superposition layer. This variant of the first embodiment is therefore preferred if there is only one type of stereo isomeric image modulators, e.g. a DMD, available. When symmetric MOEMS, or a stereo-isomeric pair of MOEMS are used, this additional reflection is not necessary.

As a further modification to FIG. 2a the first illumination beam (11) incident on the first mirror array (1) has light properties which are matched with the reflection characteristics of the superposition layer. This is indicated by the dashed lines of the beams (11,12,13), and the dashed line of the superposition layer (14). As a consequence, most light of the ON-beam (12) is reflected at the superposition layer. The specificity of the second ON-beam (22) is, in the example, only provided by the transmission through the superposition layer, and the transmitted portion (25) of the second ON-beam suffers from the light loss to the reflected portion (26)

In many cases, as is shown in the following embodiments, a selection of the second illumination beam characteristic to the transmission characteristic of superposition layer (14) is also conceivable and in fact, mostly preferred.

As a third modification to FIG. 2a, the projection optics (9) are shown with an axis, which does not include the angle $\alpha$ with the superposition beam (4), but, as in the example, is oriented along axis of the superposition beam 4). The example was chosen to indicate that the certain layout of projection optics of FIG. 2a is not a requirement and not part of the disclosure.

FIG. 2c shows a second variant of the first embodiment of a 2-MOEMS display. Like the modification shown in FIG. 2b, it is a simple extension by the addition of an unspecific reflection surface. In FIG. 2c, an additional reflection surface (28) folds the second ON-beam (22). In this variant, both ON-beams are folded. This variant has the consequence that the second image, which is modulated by the second mirror array (2) is transformed to a mirror image, which may generate an equivalence to the folding of the first image by the reflection at the superposition layer (14).

In this variant, the superposition image is a mirror image of the modulated images, and in the superposed beam (4) both channels include one folding.

As a further modification both illumination beams have light properties, which are matched with the reflection/transmission characteristics of the superposition layer (14). Accordingly, a predominant portion of the light of both ON-beams (12, 22) can be used for the projection.

Like the variant shown in FIG. 2b, this variant is preferred if only one type of a stereo-isomeric MOEMS, like a DMD, is available. FIG. 2c explains that all partial images of the superposition image can be virtual images. Both partial images (and their planes 150, 250) are derived by the reflection of the images on the mirror arrays. Like in FIG. 2a,b, also in the variant shown in FIG. 2c the planes of the partial images (150, 250) are oriented parallelly, the normals (151, 251) of these planes including the angle $\alpha$ with the axis of the superposed beam (4).

FIG. 2d shows a third variant of the first embodiment in which, like in FIG. 2c, both ON-beams are reflected. However, both reflection layers are selective, and they have a crossed structure. Both reflection surfaces (14, 24) act as superposition layers in a common x-structure, and preferentially they have reciprocal transmission and reflection characteristics. Superposition layer (14) reflects light properties which transmit superposition layer (24), and superposition layer (24) reflects light properties which transmit superposition layer (14). A structure like this is widely used for spectral properties (color cube) and has also been disclosed for polarization properties (crosspolarizer, US).

FIG. 3a-d show variants of a second embodiment of our invention. FIG. 2a shows a 3-MOEMS display, which is a extension of the 2-MOEMS display shown in FIG. 2d. A third mirror array (3) is added as a third spatial modulator. A third illumination beam (31) is guided to the third mirror array (3) such that it incides on the mirror with an illumination angle δ to the normal (301) of the mirror in its ON-state (comp. FIG. 1c). This illumination angle δ is larger than the ON-deflection angle β1 of the mirrors, and therefore, according to the laws of reflection, the ON-beam is reflected in a direction which is different from the normal (301) of the plane (300) of the mirror array, and it includes the same zenith angle α with this normal as the other ON-beams. The third mirror array (3) is arranged such that its ON-beam (32) transmits both the superposition layers (14, 24) in same axis of a common superposition beam (4), in which the first (12) and the second (22) ON-beams are reflected.

Figure 3:
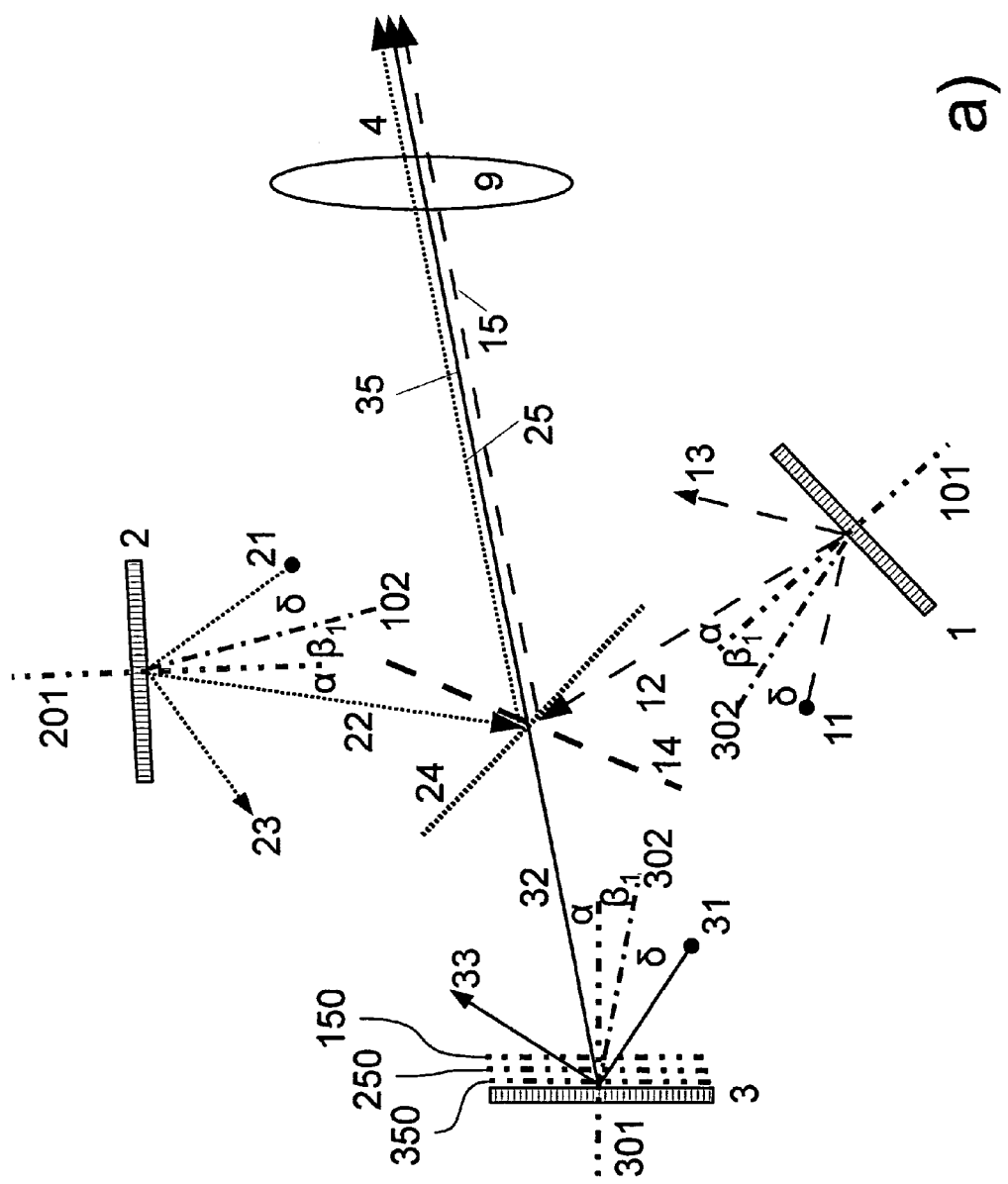
Figure 3:
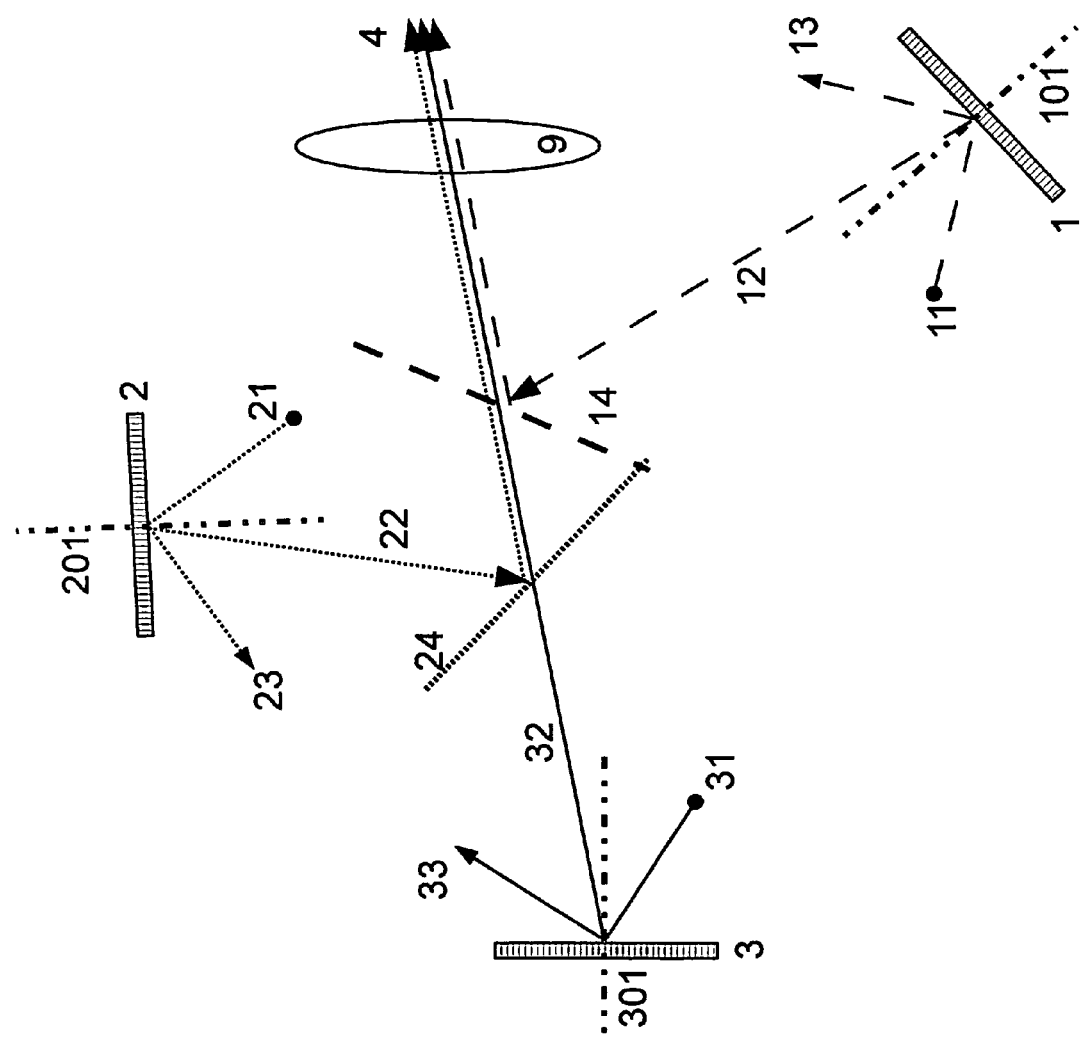
Figure 3:
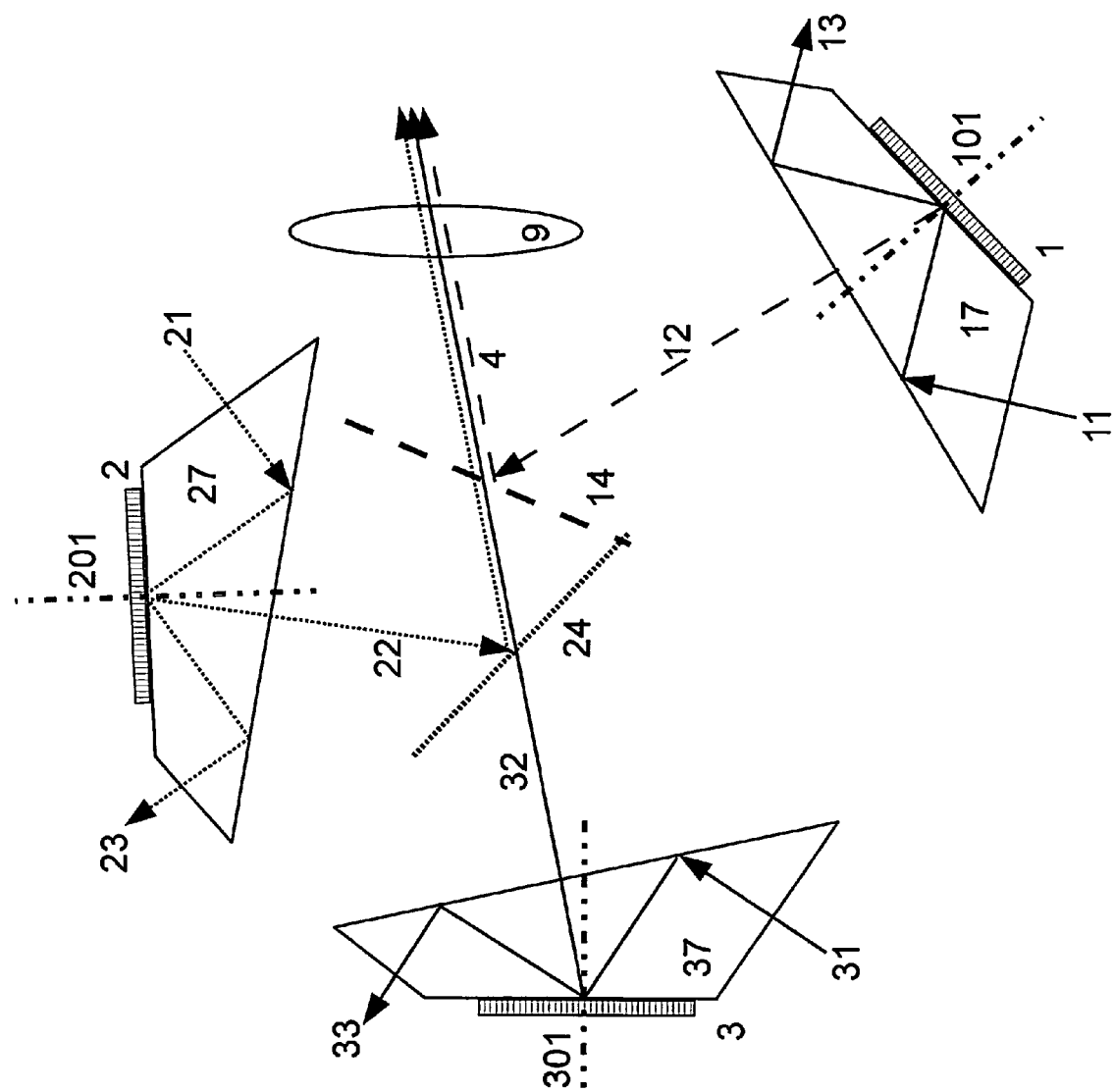

Like in the 2-MOEMS displays described in FIGS. 2a-d, in the 3-MOEMS displays of FIG. 3 the planes (150, 250, 350) of the partial images are coplanar, and the normals of these planes (151, 251, 351) include the same angle α with the axis of the superposed beam (4). The superposition image in FIG. 3a contains now three partial images, two virtual (150, 250) and a real image component (350, which is identical with the plane of the third mirror array 300).

FIG. 3b shows a minor modification, a variant of the second embodiment, where the first (14) and second (24) superposition layers are not crossed, but arranged to sequentially superpose the three partial images to a common superposition beam (4). In both variants of the second embodiments, stereoisomeric pairing should be used, if the MOEMS used for the spatial modulators are stereo-isomeric, whereby the modulator (3) from which the transmitting ON-beam (32) originates, and the modulators (1, 2) from which the reflected ON-beams (12, 22) originate, should have different handedness.

For the variant shown in FIG. 3c can, even if the MOEMS have a stereo-isomeric form, a single type be used, because the third ON-beam (32) is folded by an additional reflection (38). Like in the 2-MOEMS display of FIG. 2c the superposition image is composed of three virtual images (compare the planes of the partial images (150, 250, 350) and is a mirror image of the images modulated at the mirror arrays. The normals (151, 251, 351) of all three image planes include the angle α with the axis of the superposition beam (4).

FIG. 3d shows that for illumination conditions according to our invention TIR-prisms can be used to further simplify the separation of the incident from the reflected beam. In FIG. 3d, TIR-prisms (17, 27, 37) are used in all three channels. Note that in the example all illumination beams (11, 21, 31), all OFF-beams (13, 23, 33) and especially all ON-beams (12, 22, 32) enter and exit the prism surfaces in a orthogonal way.

Figure 4:
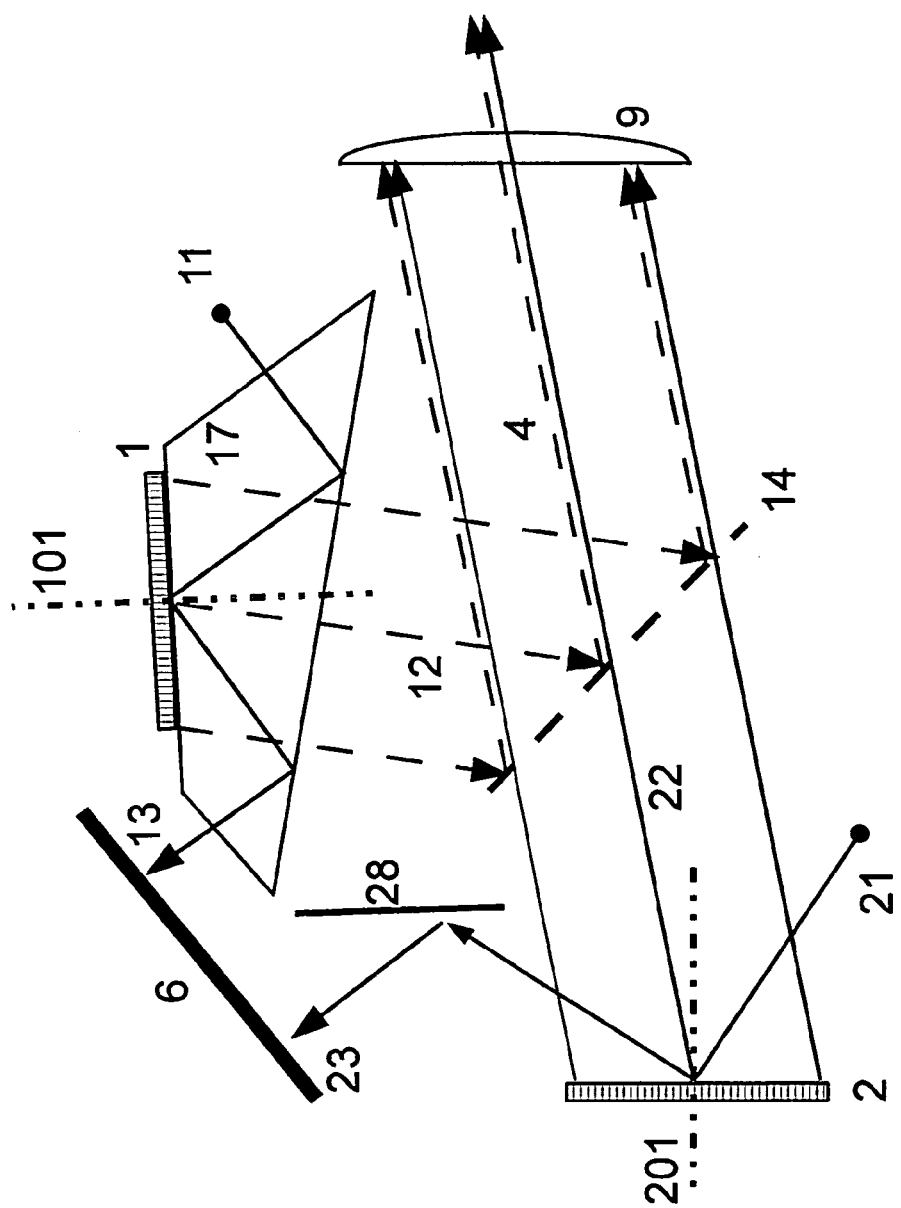

FIGS. 4a and 4b show that tele and non-tele illumination can be used within the scope of our invention. Boths figures show the consequences of illumination in the example of a 2-MOEMS display according to our invention, where in one channel a TIR prism (17) is used, while in the second channel there is no prism. While this asymmetry is usually unpreferred, it serves here to demonstrate that the type of illumination and the use of a TIR-prism are independent system layout options. In FIG. 4a tele-illumination is used, where the exit pupil of the illumination optics (not shown) has a focal length at infinity or in the tele-range. Thus, the incident beams (11, 21), the modulated ON-beams (12, 22) and later the superposed beams (4) are reflected parallel or almost parallel onto the entry pupil of the projection optics (9).

FIG. 4a shows, for the first time, a dump (6), an area to absorb the light unused for the display, and derived from the OFF-beams (13, 23).

FIG. 4b shows the example of a non-tele illumination. Here, the exit pupil of the 22) obviously converge into the direction of the entry pupil of the projection system (9). Both illumination types are thus within the scope of our invention, as is the use of TIR-prisms, which is, as has been described, not required and which is sometimes not preferred.

FIG. 5a,b show as a third and a forth embodiment of the invention 2-MOEMS displays with a beam splitter configured to split the light of a common light source. In both FIG. 5a,b a light beam (71), which is used to illuminate both MOEMS, is split by a beam splitter (74) into two sub-beams which have different light properties. The splitter could be realized by a polarization splitter or a color splitter or any other splitter. In the embodiment shown in FIG. 5a, the sub-beams are guided by two TIR-prisms (17, 27) as illumination beams onto to first (1) and second (2) mirror arrays of the two image modulators. The reflected ON-beams (12, 22) are superposed to a superposition beam (4) and projected by a projection optics (9). This arrangement could be completed by a lamp, an integrator, a color wheel and illumination optics to a complete stereo-color display. FIG. 5a shows a rather compact arrangement, in which an orthogonal beam split at the beam splitter (74) and a normal superposition at the superposition layer (14) are possible. Therefore, a splitter and combiner which require this normal and orthogonal situation, e.g. a standard PBS (after MacNeille) could be used. For the arrangement shown in FIG. 5a a mirror symmetric pair of MOEMS is to be used, that may be either a pair of internally symmetric MOEMS or a pair of stereo-isometric MOEMS.

FIG. 5b shows, as a fourth embodiment, a similarly compact 2-MOEMS display, which however does not use TIR-prisms. As in the third embodiment, an illumination beam (1) is split by an input beam splitter (74) to two sub-beams, which are directly incident on the mirror arrays (1, 2) of a first and a second image modulator. In contrast to the third embodiment, the split and the combine are not orthogonal, but they could be normal. Dichroic layers as color separators or wire grid polarization beam splitters or other splitters, which do not require orthogonal conditions, could be used as split and combine layers. While in the drawing the split (74) and the superposition layer (14) have reciprocal characteristics, a single layer could be used for both the split and the combine (not shown). If this layer had the same characteristics as the splitter (74) shown in FIG. 5b, the superposed beam (4) would leave on the other side of the superposition layer, because the first ON-beam (12) would be reflected, and the second ON-beam (22) would transmit the single layer (14/74). Under certain aspects, and in contrast to the third embodiment, the two OFF-beams could be disposed at a common dump (6).

Figure 6:
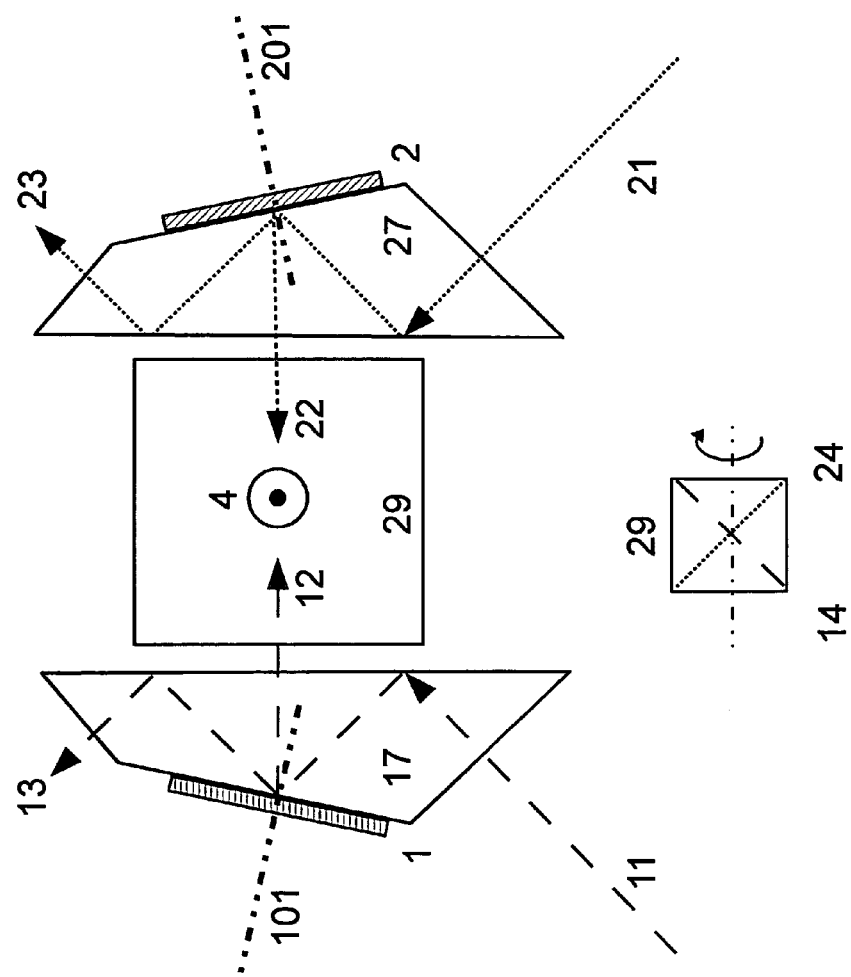
FIG. 6 Fifth embodiment: 2-MOEMS display, normal superposition with a X-polarizer.

FIG. 6 shows a fifth embodiment. It is also a 2-MOEMS display which uses TIR-prisms to separate illumination and modulated ON-beams. For the superposition a crosspolarizer (29), which can be conceived to consist of two crossed beam splitters, is used. The cross- or X-polarizer as shown in the bottom inset drawing is rotated by 90° in the exemplary arrangement. The superposed beam (4) therefore leaves the arrangement normal to the drawing plane (indicated by the encirceled axis of the beam). The arrangement shows a very compact 2-MOEMS display, which can use a single type of MOEMS independent on whether it is a stereo-isomer or not.

Figure 7:
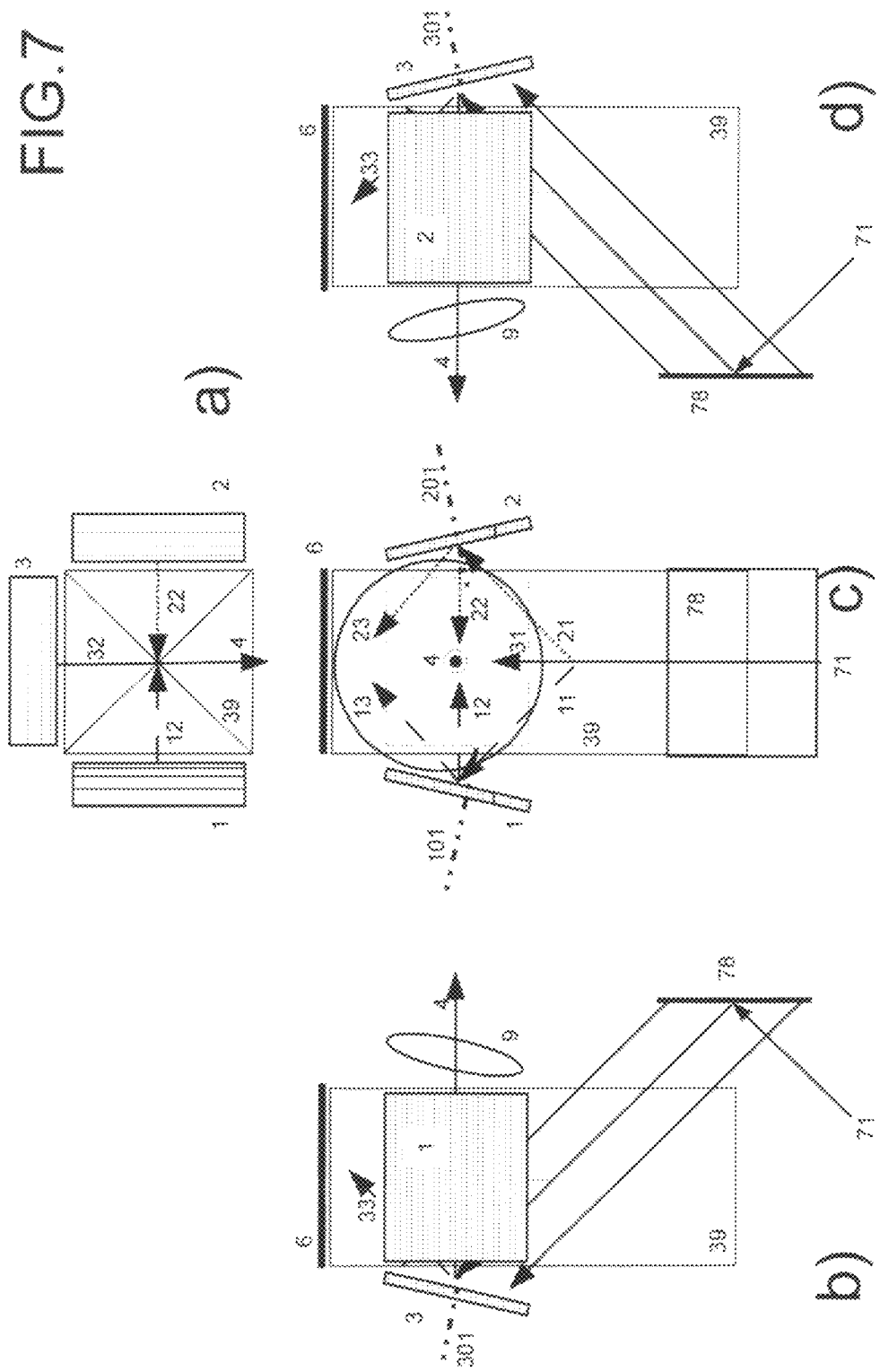
FIG. 7 Sixth embodiment: 3-MOEMS display, non-normal beam splitting and normal superposition with a color splitting cube.

FIG. 7 shows, in a sixth embodiment of the invention, an arrangement of a 3-MOEMS display, in which a color splitting cube is used for the both the splitting of a common input light into 3 incident beams and for the superposition of the 3 ON-beams into one superposed beam. FIG. 7 shows the arrangement in a top view (FIG. 7a), a front view (FIG. 7c) and two side views (FIG. 7b,d). The top view shows that on three sides of the color splitter (39) image modulators are attached, the first (1) and the second (2) on the sides, the third in the back (top in FIG. 7a). The three ON-beams (12, 22, 32) are superposed by the color splitter and leave as superposed beam (4) on the front side (bottom in FIG. 7a). The side view in FIG. 7b shows the elongated color splitting cube, the back of the first image modulator (1) and the third image modulator (3) located on the back of the cube in a side view. The side view shown in FIG. 7d shows the opposite side of the elongated color splitting cube, with the back of the second image modulator (2). FIG. 7c shows a front view, in the direction of the leaving superposition beam (4), which leaves the arrangement normal to the drawing plane. The light of an input beam (71), here optionally reflected at a mirror (78), enters the color splitting structure from the front (see FIG. 7b,c,d). The structure for the color split comprises two crossed dichroic layers, which e.g. reflect red light into a first direction, blue light into another direction and transmit green light. The color splitting structure splits the illumination beam into three incident beams (11, 21, 31, FIG. 7c). Preferred for this arrangement are MOEMS which have a horizontally arranged mirror deflection axis, which is in the drawing plane of FIG. 7a, and normal to the drawing plane in FIGS. 7b-d. All OFF-beams are therefore directed to the top of the structure (comp. FIG. 7b-d), where a dump (6) disposes this OFF-light. With the conditions for the angles according to the invention, the ON-beams (12, 22, 32) are reflected with an zenith angle $\alpha$. In the arrangement, these ON-beams are preferentially oriented in a horizontal plane. The MOEMS, respectively the mirror arrays are correspondingly tilted, so that a normal superposition by the color splitting structure an be achieved (the normals of the dichroic layers being coplanar to the plane of superposition, which is both the ON beams and the normals of the layers are parallel to the drawing plane in FIG. 7a, see ON-beams 12, 22 in FIG. 7c). The color split, achieved by the same structure at which the normal superposition takes place, is not a normal split—the normals of the dichroic layers of the color splitting structure are not in the split plane. The exemplarily shown arrangement is very compact, and uses a small number of components. Internally symmetric MOEMS, especially with mirror axes parallel to the lines of the mirror array simplify the layout of projective devices with this arrangement. In this case, the azimuth angle $\phi$ is 90° (or 0°).

Figure 8:
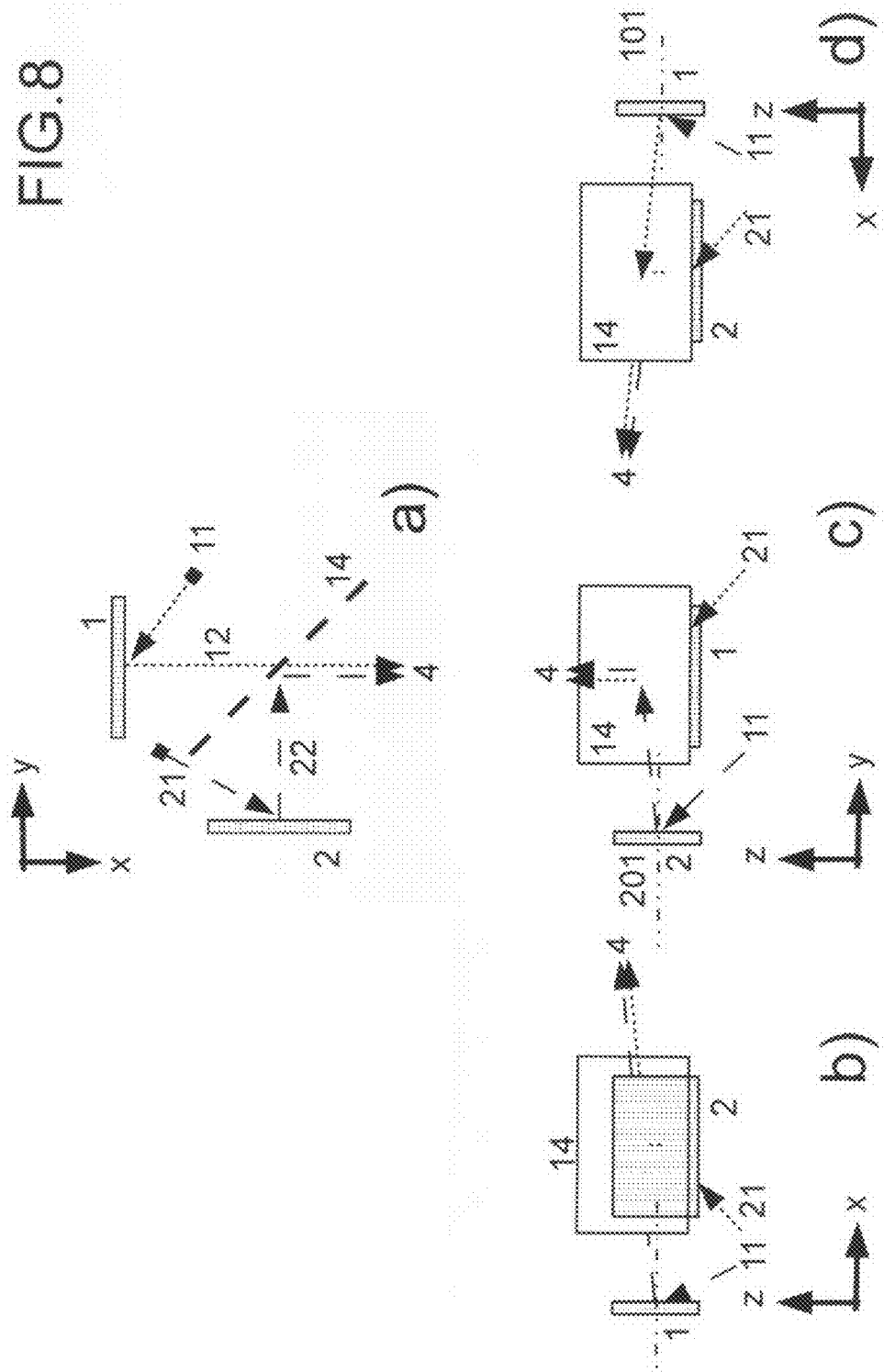
FIG. 8 Seventh embodiment: 2-MOEMS display with non-normal superposition
Figure 9:
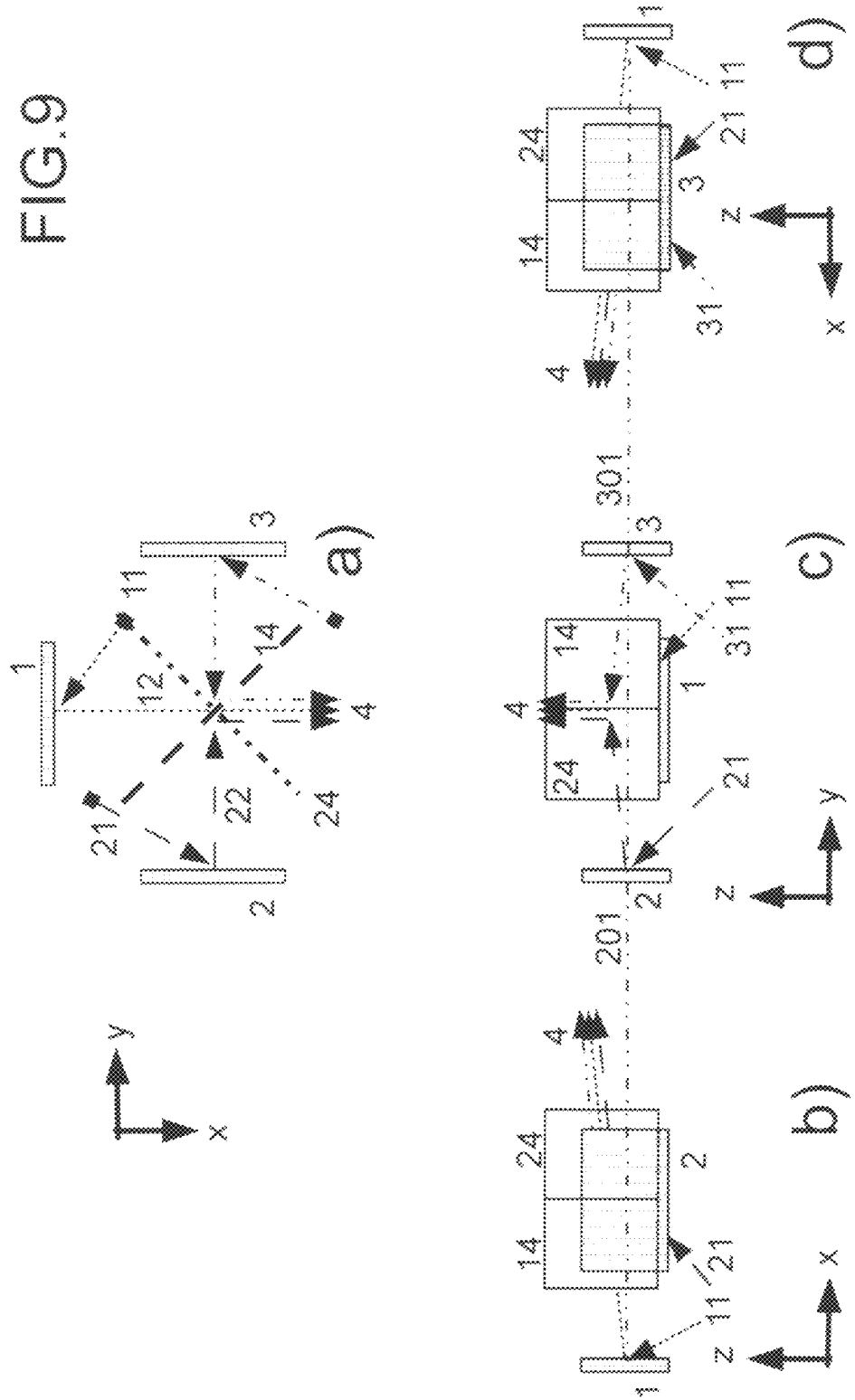
FIG. 9 Eighth embodiment: 3-MOEMS display with non-normal superposition

FIGS. 8 and 9 show in a seventh and an eighth embodiment, 2-MOEMS and 3-MOEMS displays with non-normal superposition of the ON-beams. Moreover, in these illustrations the azimuth angle $\phi$ is defined 90° or 0°.

FIG. 8 shows schematically a 2-MOEMS display with non-normal superposition, again in a top view (FIG. 8a) and three side views (FIG. 8b-d). For a better readability we have included the drawing plane of each figure in a x,y,z coordinate system, with x and y defining the horizontal plane. Two mirror arrays (1, 2) are arranged such that the normals (101, 201) of their planes (100, 200) are in a plane which is parallel to the horizontal plane (see FIG. 8b,c). The illumination beams (11, 21) are directed onto the mirror arrays such that, again with the requirements of the invention, the reflected ON-beams (12, 22) are superposed by the superposition layer (14, see FIG. 8a).

Corresponding with a illumination angle $\delta$, which is larger than the ON-deflection angle $\beta 1$, the ON-beams (12, 22) include a zenith angle $\alpha$ with the normals (101, 201) of the planes of the mirror arrays (see FIGS. 8b-d). The superposition beam leaves the arrangement in a direction which is inclined to the horizontal by the zenith angle $\alpha$ (FIG. 8b,d). The superposition is not normal, because the normal of the superposition layer (parallel to the horizontal x,y plane) is not parallel to the superposition plane (spanned by the ON-beams (12, 22). The 2-MOEMS display can be equipped with a single type of a stereo-isomeric MOEMS, e.g. the DMD as produced by Texas Instruments. For the non-normal superposition a wire grid polarizer or a dichroic layer or any other splitter can be used, which is configured to split and combine the illustrated beam geometry. The arrangement can be easily completed by the addition of a color wheel or other sequential color providing means to a color stereoscopic display.

FIG. 9 shows a 3-MOEMS display. It completely comprises the 2-MOEMS display shown in FIG. 8. It differs from the 2-MOEMS display by the addition of a third mirror array (3), and by the addition of a second superposition layer (24). For a preferred compact layout, the superposition layers are examplarily shown to be crossed.

Although the present invention is described by way of detailed embodiments, the presented realizations described in text and drawings serve as illustrations of the invention and not as limitations of the invention. Obviously, an extension of the number of MOEMS can easily be achieved by simply adding more MOEMS and additional superposition layers. Various other alternations and modifications will become apparent to those skilled in the art after reading the above disclosure. Accordingly, it is intended that the scope and true spirit of the invention is defined by the following claims:

The invention claimed is:

1. Multi-MOEMS display, comprising
at least one light source;
at least a first (1) and a second (2) micro mirror array as spatial light modulators, wherein each single micro mirror can be deflected to an OFF-state and to an ON-state, in which the normal (102) of the mirror includes an ON-deflection angle ($\beta 1$) with the normal (101) of the plane (100) of the first micro mirror array;
a first light guidance in which a first incident beam (11) incides on the first micro mirror array such that
the axis of the incident beam (11) includes an illumination angle ($\delta$) with the normal (102) of single mirrors of the first micro mirror array in their ON-state, the illumination angle ($\delta$) being larger than the ON-deflection angle ($\beta 1$),
the first (12) ON-beam, reflected from the surface of the first micro mirror array in the ON-state includes an zenith angle ($\alpha$) with the normal (101) to the plane (100) of the first micro mirror array,
the normal projection (121) of the axis of the first ON-beam (12) onto the plane (100) of the first micro mirror array includes an azimuth angle $\phi$, wherein $-90° < \phi \leq +90°$, with the rows of the first micro mirror array;
a second light guidance in which a second incident beam (21) incides on the second micro mirror array such that
the axis of the second incident beam (21) includes an illumination angle ($\delta$) with the normal (202) of single mirrors of the second micro mirror array in their ON-State, which is larger than the deflection angle ($\beta 1$),
the second (22) ON-beam, reflected from the surface of the second micro mirror array in the ON-state, includes said zenith angle ($\alpha$) with the normal (201) of the plane (200) of the second micro mirror array,
the normal projection (221) of the axis of the second ON-beam (22) onto the plane (200) of the second micro mirror array includes an azimuth angle of +φ or −φ with the rows or columns of the second micro mirror array;

a superposition system, comprising at least a first superposition layer (14);

an arrangement of the superposition system and of the first and second micro mirror arrays in which the first superposition layer (14) is configured to reflect a portion (15) of the first ON-beam (12), and to transmit a portion (25) of the second ON-beam (22), and to reflect the portion (15) of the first ON-beam (12) into the same axis in which the portion (25) of the second ON-beam (22) transmits it;

an arrangement of the superposition system and of the plane (100) of the first micro mirror array and of the plane (200) of the second micro mirror array to form a common superposition image in a common plane, whereby the plane (100) is transformed by at least the reflection at the first superposition layer (14) to the superposition image plane (150);

projection optics configured to project the superposition image.

2. Multi-MOEMS Display according to claim 1, comprising a second superposition layer (24);

an arrangement of the superposition system and of the first (1) and second (2) micro mirror arrays in which the second superposition layer (24) is configured to reflect a portion (25) of the second ON-beam (22), and to transmit a portion (15) of the first ON-beam (12), and to reflect the portion (25) of the second ON-beam (22) into the same axis in which the first superposition layer (14) reflects the portion (15) of the first ON-beam (12);

an arrangement of the superposition system and of the plane (100) of the first (1) micro mirror array and of the plane (200) of the second (2) micro mirror array to form a common superposition image in a common plane, whereby the plane (200) is transformed by at least the reflection at the second superposition layer (24) to the superposition image plane (250).

3. Multi-MOEMS Display according to claim 1, comprising a third micro mirror array (3) as spatial light modulator, wherein each single micro mirror can be deflected to an OFF-state and to an ON-state, in which the normal (302) of this mirror includes an ON-deflection angle (β1) with the normal of the plane (300) of the third micro mirror array;

a third light guidance in which a third incident beam (31) incides on the third micro mirror array (3) such that
the axis of the third incident beam (31) includes an illumination angle (δ) with the normal (302) of single mirrors of the third micro mirror array in their ON-state, which is larger than the ON-deflection angle (β1), the third (32) ON-beam, reflected from the surface of the third micro mirror array in the ON-state, includes the same angle α with the normal (301) of the third micro mirror array;

said superposition system comprising a second superposition layer (24);

an arrangement of the superposition system and of the second (2) and third (3) micro mirror arrays in which the second superposition layer (24) is configured to reflect a portion (25) of the second ON-beam (22), and to transmit a portion (35) of the third ON-beam (32), and to reflect the portion (25) of the second ON-beam (22) into the some axis in which the portion (35) of the third ON-beam (32) transmits it;

an arrangement of the superposition system and of the plane (200) of the second (2) micro mirror array and of the plane (300) of the third (3) micro mirror array to form a common superposition image in a common plane, whereby the plane (200) of the second micro mirror array is transformed by at least the reflection at the second superposition layer (24) to the superposition image plane (250).

4. Display method, using a system as claimed in claim 3 to display at least 3 spectrally different partial images of a color image.

5. Multi-MOEMS display according to claim 1, comprising at least two light sources.

6. Multi-MOEMS display according to claim 1, wherein the angle between the optical axis of the projection optics and the superposed ON-beams is α.

7. Multi-MOEMS display according to claim 1, wherein the image modulators have a stereo-isomeric architecture concerning mirror deflection axis and micro mirror raster, and both stereo-isomeric types, the left- and the right-handed forms are used.

8. Multi-MOEMS display according to claim 1, wherein the image modulators hove a stereo-isomeric architecture concerning mirror deflection axis and micro mirror raster, and only one stereo-isomeric type, the left- or the right-handed form is used.

9. Multi-MOEMS display according to claim 1, wherein the image modulators are a symmetric structure concerning mirror deflection axis and micro mirror raster.

10. Display method, using a system as claimed in claim 1 to display a multi-channel image.

11. Display method, using a system as claimed in claim 1 to display left and right images of stereo image pairs.

* * * * *